United States Patent
You et al.

(10) Patent No.: US 11,070,488 B2
(45) Date of Patent: Jul. 20, 2021

(54) SYSTEM AND METHOD TO CONTROL A CROSS DOMAIN WORKFLOW BASED ON A HIERARCHICAL ENGINE FRAMEWORK

(71) Applicant: ELECTRONICS AND TELECOMMUNICATIONS RESEARCH INSTITUTE, Daejeon (KR)

(72) Inventors: Tae Wan You, Daejeon (KR); Yeon Hee Lee, Daejeon (KR); Cheol Sig Pyo, Sejong-si (KR); Yong Geun Hong, Daejeon (KR); Min Suk Kim, Daejeon (KR); Woong Shik You, Sejong-si (KR); Seong Ik Cho, Daejeon (KR); Hyun Joong Kang, Daejeon (KR); Kwi Hoon Kim, Daejeon (KR); Hyun Jae Kim, Incheon (KR); Ho Sung Lee, Daejeon (KR); Jung Ha Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/234,513

(22) Filed: Dec. 27, 2018

(65) Prior Publication Data
US 2020/0014633 A1 Jan. 9, 2020

(30) Foreign Application Priority Data

Jul. 3, 2018 (KR) .................. 10-2018-0076855
Dec. 24, 2018 (KR) .................. 10-2018-0168733

(51) Int. Cl.
*H04L 12/915* (2013.01)
*H04W 76/10* (2018.01)
(Continued)

(52) U.S. Cl.
CPC .......... *H04L 47/785* (2013.01); *G06F 9/5072* (2013.01); *H04L 41/0893* (2013.01);
(Continued)

(58) Field of Classification Search
CPC ..... G06F 9/48; G06F 9/50; G06F 9/54; G06F 9/505; G06F 9/542; G06F 9/4881;
(Continued)

(56) References Cited

U.S. PATENT DOCUMENTS

2013/0311551 A1 11/2013 Thilbeault
2016/0189081 A1* 6/2016 Gajdzinski ....... G06Q 10/06393
705/7.39

(Continued)

FOREIGN PATENT DOCUMENTS

WO WO 2015/164359 A1 10/2015
WO WO 2017/129742 A1 8/2017

OTHER PUBLICATIONS

Pushkara Ravindra et al., "ECHO: An Adaptive Orchestration Platform for Hybrid Dataflows across Cloud and Edge", Jul. 5, 2017, arXiv:1707.00889v1 [cs.DC], submitted on Jul. 4, 2017 to arXiv.org, pp. 1-19.

*Primary Examiner* — Robert B Harrell
(74) *Attorney, Agent, or Firm* — Rabin & Berdo, P.C.

(57) ABSTRACT

Provided are a system and method for controlling a workflow across domains on the basis of a hierarchical engine framework. Inventive workflow control makes it possible to configure a flexible hierarchical engine framework and provide a workflow service with low latency. Also, the system and method make it possible to control a workflow by building an engine and a data pipeline across domains.

12 Claims, 15 Drawing Sheets

(51) Int. Cl.
*G06F 9/50* (2006.01)
*H04L 12/24* (2006.01)
*H04L 12/911* (2013.01)
*H04L 12/935* (2013.01)
*H04L 29/08* (2006.01)
*H04W 12/08* (2021.01)
*H04W 12/69* (2021.01)

(52) U.S. Cl.
CPC .......... *H04L 47/782* (2013.01); *H04L 47/824* (2013.01); *H04L 49/3063* (2013.01); *H04L 67/12* (2013.01); *H04W 12/08* (2013.01); *H04W 12/69* (2021.01); *H04W 76/10* (2018.02); *G06F 2209/505* (2013.01)

(58) Field of Classification Search
CPC .... G06F 9/5038; G06F 9/5072; G06F 9/5083; G06F 17/30864; G06F 2209/505; G06F 9/5088; G06F 13/00; G06F 16/25; G06F 16/951; G06F 16/2457; G06F 16/24575; G06F 17/30; G06F 17/30528; H04L 29/08; H04L 29/08072; H04L 29/08144; H04L 29/08171; H04L 41/0893; H04L 47/782; H04L 47/785; H04L 47/824; H04L 49/3063; H04L 67/12; H04L 67/2895; H04L 12/24; H04L 12/911; H04L 12/915; H04L 12/935; H04L 12/5695; H04L 29/06; H04L 67/00; H04W 12/00; H04W 12/08; H04W 12/0051; H04W 76/10; H04W 12/69
USPC .......................................... 709/226; 718/105
See application file for complete search history.

(56) References Cited

U.S. PATENT DOCUMENTS

| | | | |
|---|---|---|---|
| 2017/0090995 A1* | 3/2017 | Jubinski | ................ G06F 9/5038 |
| 2017/0118311 A1 | 4/2017 | Frydman et al. | |
| 2017/0264526 A1 | 9/2017 | Lee et al. | |
| 2017/0295109 A1 | 10/2017 | Byers et al. | |
| 2017/0366472 A1 | 12/2017 | Byers et al. | |
| 2018/0067779 A1 | 3/2018 | Pillalamarri et al. | |

* cited by examiner

SYSTEM AND METHOD TO CONTROL A CROSS DOMAIN WORKFLOW BASED ON A HIERARCHICAL ENGINE FRAMEWORK

CROSS-REFERENCE TO RELATED APPLICATION

This application claims priority to and the benefit of Korean Patent Application Nos. 2018-0076855 and 2018-0168733, filed on Jul. 3, 2018 and Dec. 24, 2018, respectively, the disclosure of which is incorporated herein by reference in its entirety.

BACKGROUND

1. Field of the Invention

The present invention relates to workflow control based on a hierarchical engine framework and, more particularly, to a system and method for controlling a cross domain workflow based on a hierarchical engine framework.

2. Discussion of Related Art

A workflow technology denotes a business process automation technology for transferring documents, information, tasks, etc. from a user (application) to another user so as to process the documents, information, tasks, etc. according to a series of operating procedure rules. In particular, a data-based service workflow requires a process of determining a data collection method of a data source, a data processing and analysis method, a result service method, and the like.

A recent workflow technology is implemented in an environment in which it is possible to use resources, such as cloud computing, as necessary, but workflow processing based on cloud computing requires rapid data analysis and processing like in a smart plant and has problems of instability, costs, etc. of a communication link to a cloud.

Edge and fog computing technologies for processing a workflow near a data source and an Internet of things (IoT) device is recently under development. However, most frameworks for edge and fog computing distribute and process the overall workload of a workflow in conjunction with a central cloud computing or cluster frameworks. For this reason, there is a necessity for an overall management system and an orchestration technology for dividing workloads to be processed in a workflow, allocating the workloads to distributed machines, and processing the distributed workloads.

Meanwhile, unlike a cloud domain which can be applied to all of various domains or a cluster framework which is built with central servers, an edge framework is developed to perform a data collection and processing operation using specialized equipments in a specific domain. As a result, numerous edge frameworks are independently developed and used according to domain purposes or service requirements, such that the numerous edge frameworks are jumbled to make it impossible to interwork or systematically cooperate with each other.

Consequently, there is a necessity for a framework configuration method and a workflow processing method for effective interworking between edge frameworks, which are specialized in specific domains (e.g., business domains such as smart cities, smart factories, and smart healthcare), and systematic interworking with and utilization of a cluster and a cloud.

SUMMARY OF THE INVENTION

The present invention is directed to providing a hierarchical engine framework which processes a workflow through a cluster framework (referred to as "cluster server group" below), which connects many computing servers to collect all data generated for a specific domain and intelligently process the collected data, and an intelligent edge or fog framework (referred to as "edge system" below), which is built near a data source to collect data by providing connectivity with resource-constrained Internet of things (IoT) devices and provide efficient and rapid information analysis.

The present invention is also directed to providing a cross-domain convergence system (referred to as "cloud server" below) which is built in a universal Internet section to include both public clouds and private clouds and may support a data transmission gateway node and a hierarchical framework used for building a workflow processing environment and a data pipeline effective over cross domain, and through which an intelligent control management system (referred to as "intelligent control system" below) may determine an engine execution environment, configure a workflow in a distributed manner, and process the distributed workflow on the basis of the engine execution environment.

According to an aspect of the present invention, there is provided an edge system for processing a workflow based on an engine framework, the edge system comprising: an edge networking entity configured to provide connectivity with a terminal; an intelligent computing entity configured to execute at least one engine for analyzing data of the terminal collected through the edge networking entity and processing a workflow; and an edge gateway entity configured to provide a function of interworking with other system through a data pipeline built based on the engine framework.

The other system may be another edge system in a domain identical to a domain of the edge system, and the edge system may sequentially interwork with the another edge system through a data pipeline built based on a horizontal engine framework.

The other system may be a cluster server group in a domain identical to a domain of the edge system, and the edge system may hierarchically interwork with the cluster server group through a data pipeline built based on a hierarchical engine framework.

The other system may be another edge system or a cluster server group, and the data pipeline may be a data path for transferring the data analyzed by the intelligent computing entity to the another edge system or the cluster server group through the edge gateway entity.

According to another aspect of the present invention, there is provided an intelligent control system for controlling a workflow of an edge system based on a hierarchical engine framework, the intelligent control system comprising: an engine database configured to store identity information of at least one engine for processing a workflow, location information of the engine, and specification information of the engine; an engine manager configured to manage the engine database; and a pipeline manager configured to manage a data pipeline of input and output data of the at least one engine according to the workflow.

The intelligent control system may further comprise an identification node configured to manage identity information of the edge system, and the identification node may map identity information of an engine that the edge system has to the identity information of the edge system.

The engine manager may manage identity information of the edge system possessing the at least one engine or identity information of a cluster server group interworking with the edge system as engine location information of the at least one engine.

When a request for engine location information including identity information of an engine required to process the workflow is received from the edge system, the intelligent control system may transfer identity information of a cluster server group having the required engine to the edge system based on the identity information of the engine.

The intelligent control system may further comprise a global engine database configured to be shared with another intelligent control system, and the intelligent control system may control a workflow in one domain comprising at least one edge system and at least one cluster server group, and cause edge systems of cross domain to interwork with each other by referencing the global engine database.

The intelligent control system may control a workflow in one domain comprising at least one edge system and at least one cluster server group and interwork with an intelligent control system of another domain through a cross-domain accessible cloud server.

According to another aspect of the present invention, there is provided a workflow control system for controlling a workflow based on an engine framework, the workflow control system comprising: an edge system comprising an edge networking entity configured to provide connectivity with a terminal, an intelligent computing entity configured to execute at least one engine for analyzing data of the terminal collected through the edge networking entity and processing a workflow, and an edge gateway entity configured to provide a function of interworking with another system through a data pipeline built based on the engine framework; and an intelligent control system configured to control the workflow based on the at least one engine and the data pipeline.

The workflow control system may further comprise a cluster server group, and the cluster server group may comprise: an engine node configured to execute at least one engine to process the workflow based on the data received from the edge system; and a gateway node configured to provide interworking with the edge system through the data pipeline built based on the engine framework.

The data pipeline may be a data path for transferring the data collected or analyzed by the edge system from the edge system to the other system.

The gateway node may provide a data input and output function to the at least one engine through the data pipeline according to the workflow.

According to another aspect of the present invention, there is provided a method for an intelligent control system to control a workflow based on an engine framework comprising an edge system and a cluster server group interworking with the edge system, the method comprising: receiving a request for engine location information including identity information of an engine required for processing a workflow from the edge system; transferring identity information of a cluster server group having the required engine to the edge system based on the identity information of the engine; and building a hierarchical data pipeline from the edge system to the cluster server group.

According to another aspect of the present invention, there is provided a method of controlling a workflow in one domain comprising a first edge system and a second edge system through an intelligent control system, the method comprising: transmitting, by the first edge system, a request for connection with the second edge system to the intelligent control system; when the intelligent control system receives the connection request, transmitting, by the intelligent control system, the connection request of the first edge system to the second edge system based on location information of the second edge system searched for based on identity information of the second edge system; and when the second edge system receives the connection request of the first edge system from the intelligent control system, transmitting, by the second edge system, a reply to the connection request to the first edge system.

The transmitting, by the second edge system, of the reply to the connection request to the first edge system may comprise: receiving, by the second edge system, the connection request of the first edge system from the intelligent control system; determining whether to authorize the connection request; and preparing to establish the connection and transmitting the reply to the connection request to the first edge system.

The method may further comprise receiving, by the first edge system, the reply to the connection request from the second edge system and configuring a networking channel for the connection.

The method may further comprise building a data pipeline spanning from the first edge system to the second edge system.

According to another aspect of the present invention, there is provided a method of controlling a workflow using an intelligent control system which controls a workflow of a first edge system and a second edge system in one domain, the method comprising: requesting, by the first edge system, the intelligent control system to acquire an engine required to process the workflow; transmitting, by the second edge system which receives the acquisition request for the required engine, the required engine or location information of the required engine to the first edge system in reply to the request; and receiving, by the first edge system, the required engine or the location information of the required engine.

According to another aspect of the present invention, there is provided an intelligent edge computing system comprising: a plurality of edge systems each comprising an edge networking entity configured to provide connectivity with a terminal, an intelligent computing entity configured to analyze data of the terminal collected through the edge networking entity, and an edge gateway entity configured to provide interworking with another edge system; and an edge identity management entity configured to separately manage identity information of the edge networking entities, the intelligent computing entities, and the edge gateway entities.

The plurality of edge systems may comprise a first edge system and a second edge system, and when a request for connection with the second edge system is received from the edge gateway entity of the first edge system, the edge identity management entity may search for a location of the second edge system and transmit the connection request to the edge gateway entity of the second edge system.

The plurality of edge systems may comprise a first edge system and a second edge system, and when the second edge system receives a connection request of the first edge system from the edge identity management entity through the edge gateway entity of the second edge system, the edge gateway entity of the second edge system may request the intelligent computing entity of the second edge system to authorize the connection request, the intelligent computing entity of the second edge system may authorize the connection request and transfer a reply to the connection request to the edge gateway entity of the second edge system, and the edge gateway entity of the second edge system may prepare to establish the connection and transmit the reply to the edge gateway entity of the first edge system.

The plurality of edge systems may comprise a first edge system and a second edge system, the intelligent computing entity of the first edge system may transmit a request for connection with the second edge system to the edge identity management entity through the edge gateway entity of the first edge system and receive a reply to the connection request from the second edge system through the edge gateway entity of the first edge system, and the edge gateway entity of the first edge system may configure a connection with the edge gateway entity of the second edge system and forward a reply including a result of the connection to the intelligent computing entity of the first edge system.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
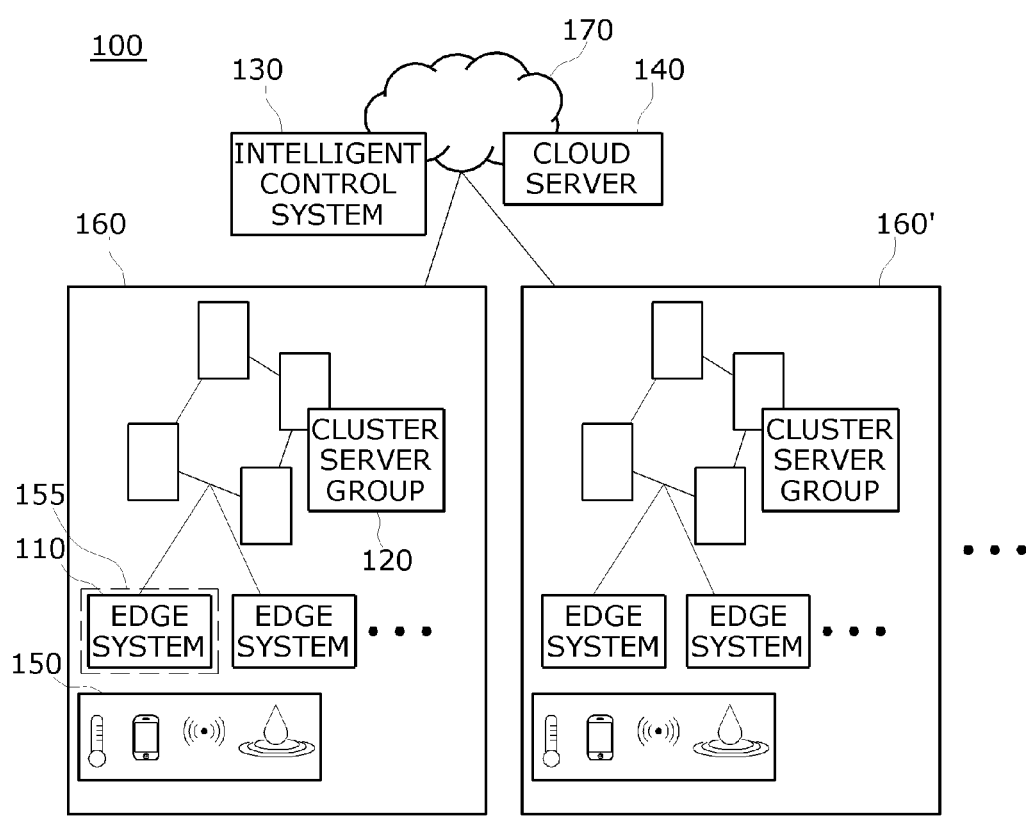
FIG. 1 shows a cross-domain workflow control system based on a hierarchical engine framework according to an exemplary embodiment of the present invention.

The objectives and effects of the present invention and the technical configurations for achieving them will be apparent with reference to exemplary embodiments described in detail below in conjunction with the accompanying drawings. A detailed description of a generally known function or structure of the present invention will be omitted when it is determined that the detailed description obscures the subject matter of the present invention. Although the terms described below are defined in consideration of their contribution to the present invention, they are subject to change depending on the intention of a user or an operator, practices, or the like.

However, the present invention is not limited to embodiments set forth herein and may be implemented in various forms. The embodiments of the present invention are provided only to render the disclosure of the present invention comprehensive and indicate the scope of the present invention to those of ordinary skill in the technical field to which the present invention pertains. The present invention is defined only by the appended claims. Accordingly, the scope of the present invention should be determined by the overall description of the specification.

The terms "comprise" and/or "comprising" when used herein specify the presence of stated components, steps, operations, and/or elements but do not preclude the presence or addition of one or more other components, steps, operations, and/or elements. Also, the terms "unit," "part," "device," "node," "module", or the like used herein refer to a unit which executes at least one function or operation and may be implemented in hardware, software, or a combination thereof. Throughout the specification, the singular forms are intended to include the plural forms as well, unless the context clearly indicates otherwise.

Hereinafter, exemplary embodiments of the present invention will be described in detail with reference to the accompanying drawings. The present invention is not limited to exemplary embodiments disclosed below and may be implemented in various forms other than the exemplary embodiments within the scope of the technical spirit of the present invention.

Recently, the so-called intelligent Internet of things (IoT) which gives artificial intelligence to various things is attracting attention. In particular, a system capable of monitoring, managing, and controlling different kinds of intelligence of things is required for an intelligent Internet application (e.g., a smart city) which encompasses multiple different kinds of IoT domains.

Also, there is a necessity for a system capable of intelligently processing various business domains (e.g., energy, health, traffic, education, electric power, and plants). In one business domain, various purpose domains may be present, including devices which generate data and perform actions, edges which process, transfer, immediately analyze, and determine data, and clouds in which complex analysis and application occur. Even in a business domain or a purpose domain, spatial domains based on spatial classification or time domains based on temporal classification may be present. Besides, various methodological domains, such as a data processing domain, a learning domain, a prediction domain, and a service domain, may be present.

Accordingly, there is a necessity for a unified method and system for effectively monitoring, managing, and controlling such a variety of complex and multi-layered domains (referred to as cross domains).

Existing cloud computing service providers have developed and are providing frameworks including separate clouds and edges thereof. However, the frameworks are specialized and exclusively used in the corresponding service domains. In other words, existing workflow frameworks do not allow interworking between different kinds of edge frameworks which are applied to various kinds of devices, and thus it is difficult to apply existing workflow frameworks to cross domains.

Meanwhile, it is necessary to interwork with a cluster framework, an edge, etc. specialized in and exclusively built for each domain so that a cloud framework may be applied to cross domains. However, it is still difficult for a big data processing platform of a general-purpose cloud domain to interwork with an edge and a cluster framework of each domain. An existing framework uses only a vertical hierarchical structure from an edge to a cloud and thus is not appropriate for a service which requires rapid data processing and actions. In other words, since it is always necessary to first interwork with a framework of a central cluster or a cloud domain, processing is delayed due to the problems of network transmission delay, data load, and connectivity, and processing with a short delay is not possible. Also, an existing workflow framework does not support a systematic workflow engine framework such as setting up a data pipeline between edge frameworks and directly using an engine instance of another edge framework.

Accordingly, there is a necessity for an orchestration technology for effectively supporting a workflow and a data pipeline spanning from edges to clusters and to a cloud over cross domain.

Exemplary embodiments of the present invention provide a system and method for processing a workflow based on a hierarchical engine framework.

A workflow is a business process which proceeds according to a series of business procedures and includes a series of tasks. A workflow technology is a workflow automation technology and denotes a technology for distributing a series of tasks constituting a workflow to appropriate computing systems and controlling and managing the workflow so that each task may be executed according to a series of business procedures. Here, a computing system is an electronic device including at least one processor capable of calculation and a memory. The ordered relation of a series of tasks may be represented as a structure such as a list, a tree, or a graph.

Each computing system processes a task distributed thereto by executing an appropriate engine. In other words, a task is processed by an engine executed by a computing system. An engine which is generated to process one workflow is one independent program package and may be distributed to identical computing machines or computing machines connected via a network and executed or may be packaged in units of virtual machines and distributed to different physical computing machines. As an example, an engine is a process which is executable in a computing system. As another example, an engine may be a container for executing an executable image. An engine receives data required for task processing, analyzes the data, and outputs analysis results. To process a workflow, a process of configuring required engines and defining an association method between the engines is necessary.

A workflow may be defined as an engine group including at least one engine which executes a series of tasks constituting the workflow, and a data access path between engine groups. Each engine receives required data from a data access path and outputs results of analyzing the data to the data access path. In other words, a data access path is a data pipeline in which data is transferred between engines according to a workflow.

In the present invention, processing a workflow denotes that one or more engines are connected to each other through a data pipeline to constitute a hierarchical engine framework, which will be described below, and perform given work by collecting data from an IoT device and storing, analyzing, and controlling the collected data. Controlling a workflow denotes setting up and controlling engines and a data pipeline required to process the workflow.

In an exemplary embodiment of the present invention, computing systems, computing devices, systems, servers, server groups, entities, server computers, electronic devices, or various devices refer to all calculation means, such as a desktop computer, a laptop computer, a smart phone, a tablet personal computer (PC), a personal digital assistant (PDA), a cellular phone, and a game machine, capable of collecting, reading, processing, storing, and displaying data.

FIG. 1 shows a cross-domain workflow control system 100 based on a hierarchical engine framework according to an exemplary embodiment of the present invention.

A framework is a structured architecture, and a hierarchical framework denotes an architecture in which entities constituting a framework are structured according to layers. A hierarchical engine framework denotes an architecture in which engines of an engine group executing a workflow are structured according to layers. Here, an entity may be a computing system including at least one processor and a memory or a server or a server group composed of a plurality of computing systems.

Hierarchical domains include a cloud domain 170 which is built in a universal Internet section including a public cloud and a private cloud, a cluster domain 160 which is built in a single service and management domain, and an edge domain 155 which is directly connected to various IoT devices and collects data. A hierarchical engine framework includes a cloud server 140, a cluster server group 120, and edge systems 110 according to layers of hierarchical domains, and the hierarchical engine framework functions to implement an engine framework for processing a workflow for data collection, storage, analysis, control, etc. from IoT devices 150.

In particular, it is possible to generate and execute a workflow appropriate for a field and a purpose of each domain by systematically configuring an engine framework, and it is possible to generate and execute a workflow appropriate for another domain by easily applying the engine framework to the other domain. Also, the cloud server (also referred to as "cloud convergence system" below) 140 is included for cross domains so that a hierarchical workflow engine framework appropriate for cross domains may be configured.

The edge systems 110 are computing systems which collect data from the IoT devices 150 including various sensors, which are data sources, and process the collected data. For example, when the cluster domain 160 is a healthcare domain, the edge systems 110 are built to directly collect data from the IoT devices 150 such as various smart healthcare devices (e.g., a smart phone, a networking gateway, and an IoT actuator) and to process the collected data. The edge systems 110 may be devices, such as a desktop computer, a laptop computer, a smart phone, a tablet PC, a PDA, a cellular phone, and a game machine, capable of collecting, reading, processing, storing, and displaying data. The edge systems 110 will be described in detail below with reference to FIG. 2.

The cluster server group 120 is one set of servers constructed by connecting physical or virtual server computers which may use many computing resources for artificial intelligence calculation, such as big data analysis and deep learning, for collecting, analyzing, and processing a large amount of data in a domain area. The cluster server group 120 is a cluster computing system for big data processing and is a distributed computing system including a plurality of servers. The cluster server group 120 may be, for example, a single server computer or a system similar thereto, or one or more server banks or a plurality of servers arranged in an array other than that of server banks. The cluster server group 120 may be located in a single facility or distributed over many different geographic locations.

Figure 4:
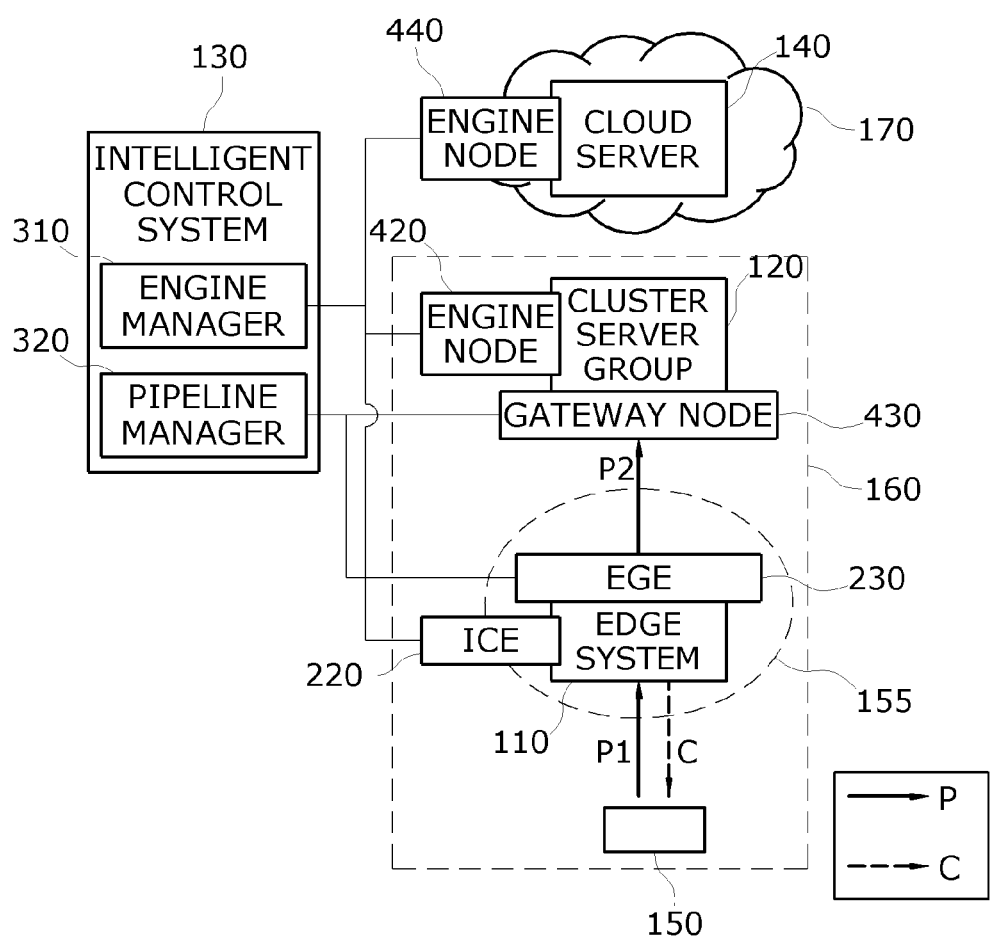
FIG. 4 schematically shows workflow control based on a hierarchical workflow engine framework according to an exemplary embodiment of the present invention.

As shown in FIG. 4, the cluster server group 120 includes an engine node 420 which controls and manages engines and a gateway node 430 which sets up a data pipeline for receiving data, transferring processing results to another engine, or transmitting the processing results to the cloud server 140. In an example, the engine node 420 and the gateway node 430 are computing systems which are physically built separately from each other. In other words, each of the engine node 420 and the gateway node 430 may be a computing system including at least one processor capable of calculation and a memory. The gateway node 430 provides a data input and output function to at least one engine managed by the engine node 420 through the data pipeline along a workflow.

An engine executed in the cluster server group 120 comprises a reader which receives data through the gateway node 430, one or more writers which outputs data processed therein to one or more data destinations, a runner which executes a separate execution program or platform for processing input data or manages sessions, and a controller which is in charge of control for receiving the data through the reader, processing the received data through the runner, and outputting processing result data. The processing results of the cluster server group 120 are transferred from the writers to the gateway node 430 and transmitted from the gateway node 430 to the data destinations. The gateway node 430 transfers the processing results to the data destinations through a data pipeline built toward the data destinations. Accordingly, the data processing results may be supplied in various ways in the hierarchical workflow engine framework or used across domains.

Referring back to FIG. 1, the cluster server group 120 is located in a higher layer than the edge systems 110 are, collects sensitive health data, and performs big data processing. Meanwhile, in the case of a smart building domain 160', a hierarchical workflow engine framework is built in a form similar to that of the healthcare domain 160. In the uppermost layer, the cloud server 140 of a public Internet domain is built and supports data sharing between the healthcare domain 160 and the smart building domain 160' or sharing of an engine which is being used in another domain. In other words, the workflow control system 100 configures a hierarchical engine framework that spans from the IoT devices 150, which are actual data sources, to the cloud server 140 via the edge systems 110 and the cluster server group 120 and builds a data pipeline.

The cloud server 140 comprises, for example, one or more server computers or a plurality of servers arranged in an array other than that of server computers, and the servers may be distributed over many different geographic locations.

Meanwhile, the intelligent control system 130 mediates building of a hierarchical engine framework and a data pipeline and controls and manages a workflow. The intelligent control system 130 may be located in the cloud domain 170. Alternatively, each domain may run the intelligent control system 130.

Figure 2:
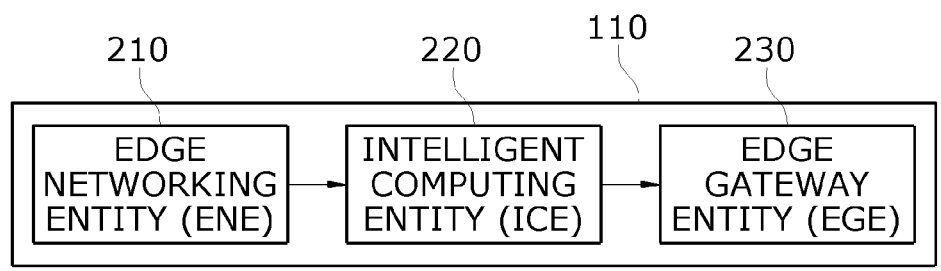
FIG. 2 is a block diagram of an edge system according to an exemplary embodiment of the present invention.

FIG. 2 is a block diagram of an edge system according to an exemplary embodiment of the present invention.

An edge system 110 includes an edge networking entity (ENE) 210, an intelligent computing entity (ICE) 220, and an edge gateway entity (EGE) 230.

Specifically, the edge system 110 includes the ENE 210 which provides connectivity with a terminal, such as the IoT devices 150, the ICE 220 which executes at least one engine for analyzing data of the terminal collected through the ENE 210 and processing a workflow, and the EGE 230 which provides a function of interworking with other system through a data pipeline built on the basis of the engine framework. The other system may be another edge system or the cluster server group 120 in the same domain or another edge system or a cluster server group in another domain.

The edge system 110 sequentially interworks with other edge systems through a data pipeline built on the basis of a horizontal engine framework. This will be described below with reference to FIGS. 7 to 11.

The edge system 110 hierarchically interworks with the cluster server group 120 through a data pipeline built on the basis of a hierarchical engine framework. This will be described below with reference to FIG. 5.

The ENE 210 provides connectivity to the IoT devices 150. The IoT devices 150 include computing devices such as various sensors, actuators, power modules, communication modules, robots, terminals, smart phones, and computers. Connectivity with the IoT devices may be communication based on heterogeneous wireless technologies. Therefore, the ENE 210 is a computing system capable of providing communication based on various wireless communication technologies. The ENE 210 is located near IoT devices and data sources in each domain area to provide direct connectivity to numerous IoT devices and receive data therefrom.

The ICE 220 has an artificial intelligence platform loaded thereon for machine learning and the like and analyzes the data collected through the ENE 210. In other words, the ICE 220 analyzes the data received from the ENE 210 by itself or provides another analysis method such as big data analysis in cloud computing. To this end, the ICE 220 collects the data received by the ENE 210 and immediately processes the collected data or sends the processing results or the collected data to the cluster server group 120 in an upper layer. Also, the ICE 220 controls the IoT devices 150 on the basis of the analysis results. Meanwhile, the ICE 220 executes a workflow engine by itself or controls and manages a workflow engine according to the hierarchical engine framework.

The EGE 230 provides a function of interworking with an external entity. As an example, the external entity may be another edge system 110' and a big data analyzer in cloud computing. As another example, the external entity may be another system or entity which interworks with the edge system 110 in the hierarchical engine framework according to a workflow. In other words, the EGE 230 may be a computing system which provides a gateway function. The EGE 230 is in charge of networking for building a data pipeline to the other edge system 110' or the cluster server group 120.

The data pipeline denotes a data path for transferring the data analyzed by the ICE 210 to the other edge system 110' or the cluster server group 120 through the EGE 230.

Each entity of the edge system 110 is composed of a separate computing system. The entities communicate with each other using various wired or wireless communication methods. In other words, each of the ENE 210, the ICE 220, and the EGE 230 may be a computing system including at least one processor capable of calculation and a memory or a server or a server group including a plurality of computing systems.

The edge system 110 may further include a data storage for storing the data collected through the ENE 210 or temporarily storing the analysis results of the ICE 220. After collecting and analyzing data received from the IoT devices 150, the edge system 110 may transmit the analysis results to other systems in the hierarchical workflow engine framework or store the results in the data storage according to a situation of a relevant service.

The edge system 110 may further comprise a reward and action node. According to a service policy, the edge system 110 may provide the reward of taking an actual action through the reward and action node and transfer an operation command to an IoT device 150 through the ENE 210. Specifically, when a reward policy is established according to a service, the reward and action node provides a reward value based on analysis results of the ICE 220 to the ENE 210 so that the ENE 210 may take a direct control action on the IoT device 150.

In the hierarchical workflow engine framework 100, the edge system 110 located near the data sources 150 in the service domain executes a detailed workflow, such as collecting and analyzing IoT data, by itself, and then the processed data is sent to the cluster server group 120 at center of the domain so that the cluster server group 120 may perform service support and artificial intelligence (or machine learning) model learning through big data analysis. Also, results of data processing in each domain may be transmitted to the cloud server 140 to be used in other domains or to reuse an artificial intelligence (or machine learning) model.

Figure 3:
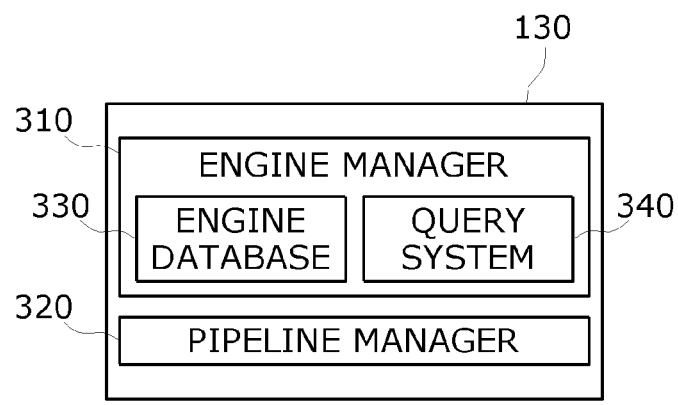
FIG. 3 is a block diagram of an intelligent control system according to an exemplary embodiment of the present invention.

FIG. 3 is a block diagram of an intelligent control system according to an exemplary embodiment of the present invention.

An exemplary embodiment of the present invention provides the intelligent control system 130 which determines an execution environment of engine components through a hierarchical workflow engine framework, configures a workflow, and controls a networking function so that a data pipeline may be built on the basis of the workflow. In other words, the intelligent control system 130 controls a workflow based on at least one engine and a data pipeline that constitute the hierarchical workflow engine framework.

The intelligent control system 130 comprises an engine manager 310 which is in charge of managing distributed engines and controlling execution of the distributed engines and a pipeline manager 320 which is in charge of establishing data pipelines according to a hierarchically configured workflow.

The engine manager 310 stores and manages engine information of engines which may be generated at runtime when each system in a workflow framework executes a task.

The engine manager 310 comprises an engine database 330 and a query system 340. The engine database 330 corresponds to a database storing engine identity information (e.g., metadata including engine names, input and output parameters, and so on) so that runtime engines may be managed as independent engine containers, and stores and manages engine information including engine identity information so that the runtime engines may be reused later. Also, the engine manager 310 includes a query system 340 for the engine database 330 and provides engine information of available engines to each system in a workflow framework.

The engine manager 310 manages the engine database 330 and performs an engine query through the query system 340 on the basis of the engine information stored in the engine database 330 to build a hierarchical workflow engine framework. Also, the engine manager 310 may manage identity information of an edge system 110 including at least one engine or the cluster server group 120 interworking with the edge system 110 as engine location information of the engine. The engine manager 310 may be, for example, a computing system including at least one processor capable of calculation and a memory.

The pipeline manager 320 supports building of a data pipeline for input and output data of at least one engine according to a workflow and manages the built data pipeline. The pipeline manager 320 may be, for example, a computing system including at least one processor capable of calculation and a memory.

The engine database 330 stores identity information of at least one engine which executes a workflow, location information of the engine, and engine specification information.

In addition, the intelligent control system 130 may include an identification node which manages identity information of the edge system 110. The identification node maps identity information of the engine that the edge system 110 possesses to the identity information of the edge system 110 and manages the identity information of the engine. The identification node may be, for example, a computing system including at least one processor capable of calculation and a memory.

The intelligent control system 130 is also referred to as an edge identity management entity (EME). The EME 130 provides functions of storing and managing identity information of all entities including the ENE 210, the ICE 220, and the EGE 230.

Also, the EME 130 maps each identify information to meta-information.

The meta-information may be, for example, a location of the ICE 220 or the EGE 230. The EME 130 generates mapping information by mapping IoT devices 150 and data identities to a plurality of edge systems 110. In other words, the EME 130 is a computing system for supporting mobility of the IoT devices 150 and mobility of data between the plurality of edge systems 110 and may identify the IoT devices 150 and data using identities.

Referring to FIG. 4, the EME 130 may store and manage identity information of the engine node 420 and the gateway node 430 of the cluster server group 120 and an engine node 440 and a gateway node of the cloud server 140.

For example, the EME 130 may manage engine identity information of engines that the ICE 220 of the edge system 110 possesses as meta-information of identity information of the ICE 220. In other words, the EME 130 maps the engine identity information of the engines that the ICE 220 of the edge systems 110 has to identity information of the ICE 220 or the EGE 230 of the edge system 110 and manages the identity information of the engines.

For hierarchical or various forms of workflow processing environments, the pipeline manager 320 may configure a networking environment for a data pipeline by controlling the EGEs 230 of the edge systems 110 and the gateway node 430 of the cluster server group 120 as shown in FIG. 4. The data pipeline may be built, for example, between the edge systems 110, between an edge system 110 and the cluster server group 120, or between the cluster server group 120 and the cloud server 140.

The EME 130 provides orchestration which effectively enables to configure a workflow and build a data pipeline across the edge systems 110, the cluster server group 120, and the cloud server 140.

The intelligent control system 130 according to an exemplary embodiment of the present invention provides an orchestration function of building a data pipeline which could transfer data generated by the IoT devices 150 to the cloud server 140 or controlling a workflow by managing engines and engine information so that already-created engine components may be used.

In particular, with engines managed in a distributed manner by the intelligent control system 130 and a function of building various data pipelines provided by the intelligent control system 130, the present invention may configure a workflow in which an edge system 110 may directly use an engine of another edge system 110 located in the same physical or logical domain without the help of the cluster server group 120 or the cloud server 140 and execute horizontal workflows in various forms of data pipelines, for example, an edge-to-edge workflow (including continuous repetition of an edge-to-edge connection).

FIG. 4 schematically shows workflow control based on a hierarchical workflow engine framework according to an exemplary embodiment of the present invention.

A circle 155 indicates an edge area, a box 160 indicates a domain area, and a cloud shape 170 indicates a cloud area. An area is an independent computing system space. Computing systems in an area are physically or logically connected and may be identified as a group with common computing resources or identified individually in or outside the area.

The domain edge area 155 denotes the area of an edge system 110. In other words, the domain edge area 155 includes an ENE 210 (not shown in FIG. 4), an ICE 220, and an EGE 230 of the edge system 110. In the domain edge area 155, each entity is identified by its entity identity. Outside the domain edge area 155, the edge system 110 is identified as the edge system 110 or identified as each entity constituting the edge system 110 by each entity identity. When the edge system 110 is identified as the edge system 110, an identity of the EGE 230 may be used as a representative identity.

The domain area 160 denotes the area of a specific domain. A domain includes resources, for example, hardware infrastructure and software solutions, which execute a purpose, a function, or a task of the domain. Additionally, a domain may denote an area in which one service is shared in terms of business. Therefore, the area of a domain is a physical or logical area affected by the corresponding resources, and each resource belonging to the domain is identified by a unique identity in the domain area. For example, the domain area 160 may be configured with a private network, such as a virtual private network (VPN), managed by one administrator or an intranet section.

The cloud domain 170 denotes an area in which all of public clouds or private clouds are generally accessible through a universal Internet section.

The edge system 110 and a cluster server group 120 belong to the domain area 160.

The cluster server group 120 includes an engine node 420 which runs at least one engine for executing a workflow based on data received from the edge system 110 and a gateway node 430 which provides a function of interworking with the edge systems 110 through a data pipeline built based on the hierarchical engine framework. A data pipeline between the edge system 110 and the cluster server group 120 is a data path for transferring data of the IoT devices 150 collected by the edge system 110 from the edge system 110 to the cluster server group 120. Through the data pipeline, the gateway node 430 provides a data input and output function along a workflow to at least one engine that the engine node 420 has.

The engine node 420 may include a running instance section which runs one or more dynamically generated engines and an engine component section which generates an engine component container instance and dynamically binds the generated engine instance to an engine component container.

An intelligent control system 130 and the cloud server 140 belong to the cloud domain 170 rather than the domain area 160. In an example, the intelligent control system 130 may be located at the boundary between the domain area 160 and the cloud domain 170.

Hereinafter, the cloud server 140 is described. The cloud server 140, which includes all of public clouds or private clouds and is located in the public Internet section, is located in the cloud domain and integrates and hierarchizes various domains by dynamically using computing resources so as to support a workflow execution environment among various domains. The cloud server 140 is a system which manages resources related to cross-domain workflow processing, allocates parts of a cross-domain workflow to respective domains as a workflow, and executes the allocated parts in frameworks of the respective domains. Therefore, the cloud server 140 comprises a cross-domain resource manager, a cross-domain system configurator, and a cross-domain system controller. The resource manager manages components required for workflow execution, the system configurator generates components required for workflow execution, and the system controller generates an engine instance by configuring necessary engine component containers according to workflow specifications.

Also, the cloud server 140 may include an engine node 440 which runs at least one engine for executing a workflow based on data received from the cluster server group 120 and the gateway node (not shown in FIG. 4) which provides a function of interworking with the cluster server group 120 through a data pipeline built based on the hierarchical engine framework. The engine node 440 may include a running instance section which may execute a workflow by itself and an engine component section. The engine node 440 may be, for example, a computing system including at least one processor capable of calculation and a memory. The gateway node may also be a separate computing system including at least one processor capable of calculation and a memory.

In FIG. 4, the hierarchically configured systems and framework have an environment for executing a workflow and a function for building a data pipeline. The hierarchically configured workflow framework may be managed, configured, and controlled by the intelligent control system 130.

As described above with reference to FIG. 3, the intelligent control system 130 includes an engine manager 310 and a pipeline manager 320. According to the hierarchical workflow engine framework, a workload executed in a distributed manner using the cloud server 140, the cluster server group 120, and the edge systems 110. The engine node 420, the engine node 440, the gateway node 430, the ICE 220, and the EGE 230 are distributed over systems. The engine manager 310 communicates with the ICE 220 of the edge system 110 and the engine node 420 of the cluster server group 120 and controls and manages engines that the ICE 220 and the engine node 420 possess and engine information of the engines. The pipeline manager 320 controls the EGE 230 of the edge system 110 and the gateway node 430 of the cluster server group 120 and builds, controls, and manages data pipelines. Additionally, the engine manager 310 may control and manage engines that the engine node 440 of the cloud server 140 possesses and engine information of the engines. Also, the pipeline manager 320 may control a gateway node of the cloud server 140 and manage a data pipeline toward the cloud server 140. To efficiently use engines present in engine containers distributed over the cluster server group 120 and the edge system 110, the engine manager 310 builds and manages the engine database 330 and the query system 340 described above with reference to FIG. 3.

A data pipeline P1 is a data access path between the IoT devices 150 and the edge systems 110, specifically, between an IoT device 150 and the ENE 210. Data generated by the IoT device 150 is received by the ENE 210 of the edge system 110 near the IoT device 150 and collected and primarily analyzed by the ICE 220. According to a service profile, the edge system 110 immediately controls the IoT device 150 through a control signal C or causes the data to flow through a data pipeline P2 spanning from the edge system 110 to the cluster server group 120 at the center of domain. Alternatively, according to a service profile, the data of an IoT device 150 may be transferred to the ENE 210 of the edge system 110 through the data pipeline P1, directly transferred to the EGE 230 without passing through the ICE 220, and then transferred to the cluster server group 120 through the data pipeline P2.

Data generated, analyzed, and processed in the domain and engine instances that respective systems in the domain possess may be sent to the cloud server 140 necessary to be reused across domains later.

Figure 5:
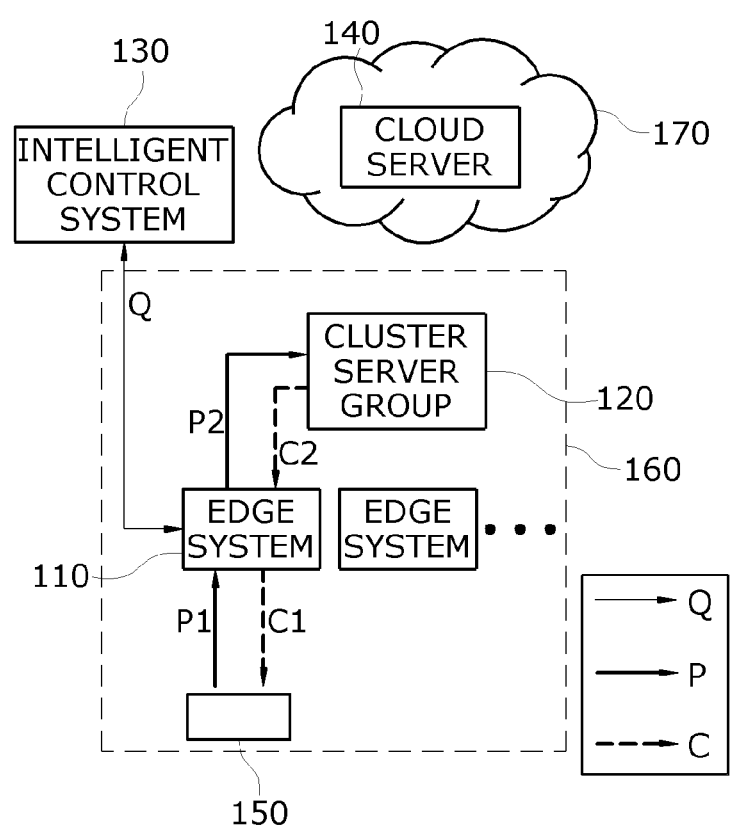
FIG. 5 shows an edge-to-cluster workflow according to an example.

FIG. 5 shows an edge-to-cluster workflow according to an example.

FIG. 5 shows an exemplary embodiment in which a workflow is distributed to edge systems 110 and the cluster server group 120 and executed. In a domain 160, a central cluster server group 120 and edge systems 110 capable of collecting and processing data of various sensors 150 through a data pipeline P1 are built in a distributed manner. Also, an intelligent control system 130 is built to manage engine information of engines which are available for a domain service and to control pipelines. In this environment, a procedure for configuring a data pipeline P2 spanning from the edge systems 110 to the cluster server group 120 and executing a workflow is as follows:

5-1. According to a domain service, an edge system 110 analyzes a service profile and makes a query Q to the intelligent control system 130 to search for relevant engine container information. For example, the query Q about engine container information may be a request for location information of an engine required for processing a workflow. The request for engine location information may include identity information of the engine required for workflow execution.

5-2. A reply to the engine container query is acquired through the intelligent control system 130. For example, an engine manager 310 of the intelligent control system 130 transfers identity information of the cluster server group 120 which possesses the engine required for workflow execution to the edge system 110 as the reply based on the identity information of the engine included in the query Q.

5-3. When a corresponding engine is present in the cluster server group 120 present at the domain center, the pipeline manager 320 of the intelligent control system 130 sets up networking to build a data pipeline and builds and controls a pipeline so that data of a sensor 150 may be processed in an edge-to-cluster manner. In other words, a hierarchical data pipeline is built from the edge system 110 to the cluster server group 120 located at a higher level. A networking process for building a data pipeline will be described below with reference to FIG. 17.

5-4. When data analysis is performed in the cluster server group 120 through machine learning and artificial intelligence and then operation of the IoT device 150 is controlled based on the analysis results, a control command is transferred through a path C2 and a path C1 by the edge system 110 directly connected to devices so that the sensor IoT device 150 may be controlled.

Figure 6:
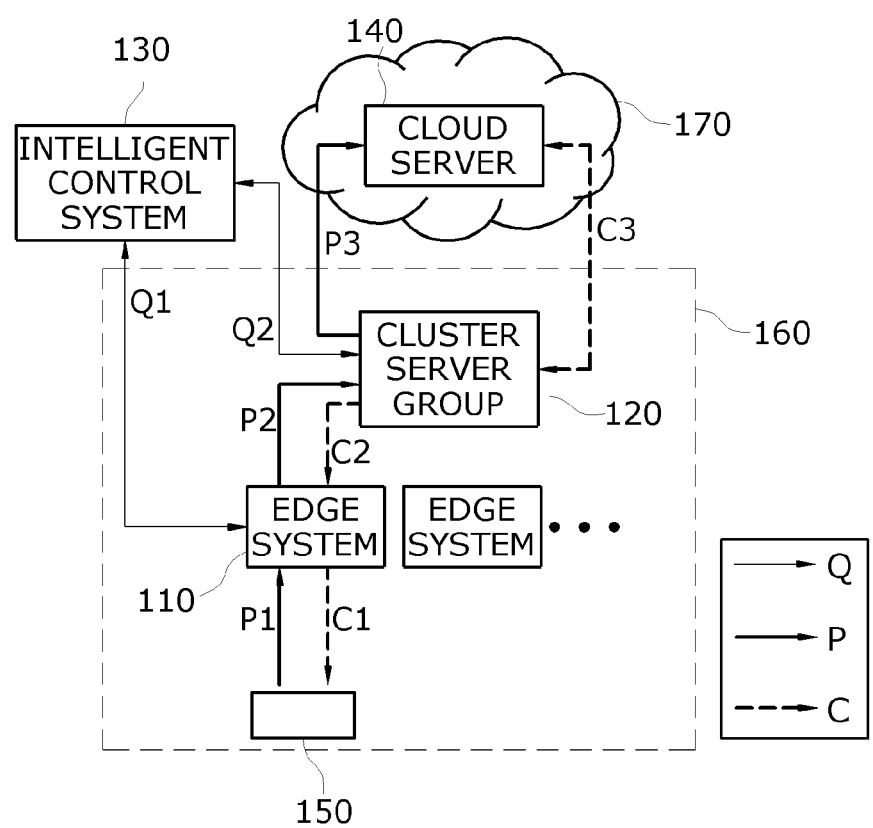
FIG. 6 shows an edge-to-cluster-to-cloud workflow according to an example.

FIG. 6 shows an edge-to-cluster-to-cloud workflow according to an example.

FIG. 6 shows a procedure of an exemplary embodiment in which an edge-to-cluster-to-cloud workflow is executed in a hierarchically distributed manner when edge systems 110 and a cluster server group 120 are built in a domain 160 and a cloud server 140 is built in a cloud domain 170.

6-1. According to a domain service, an edge system 110 analyzes a service profile and makes a query to an intelligent control system 130 to search for relevant engine container information.

6-2. After an engine manager 310 of the intelligent control system 130 checks that a relevant engine container is located in the cluster server group 120, a pipeline manager 320 builds a data pipeline P2 spanning from the edge system 110 to the cluster server group 120.

6-3. When interworking with the cloud server 140 is necessary again because a workflow operation is additionally required for the service profile or the relevant engine container is not present in the cluster server group 120, the cluster server group 120 requests interworking with the cloud server 140 from the intelligent control system 130 and performs a query for an engine container again.

6-4. The pipeline manager 320 of the intelligent control system 130 builds a pipeline P3 spanning from the cluster server group 120 to the cloud server 140. Then, it is possible to directly transfer data analyzed by the cluster server group 120 to the cloud server 140.

6-5. As a result of configuring the edge-to-cluster-to-cloud workflow, a control command for controlling the IoT device 150 is transferred through the paths C3 and C2 and a path C1 via the edge system 110 located near an IoT device 150 like in the case of FIG. 5 described above. The respective operations of FIG. 6 may be performed in sequence, in parallel, or concurrently.

Figure 7:
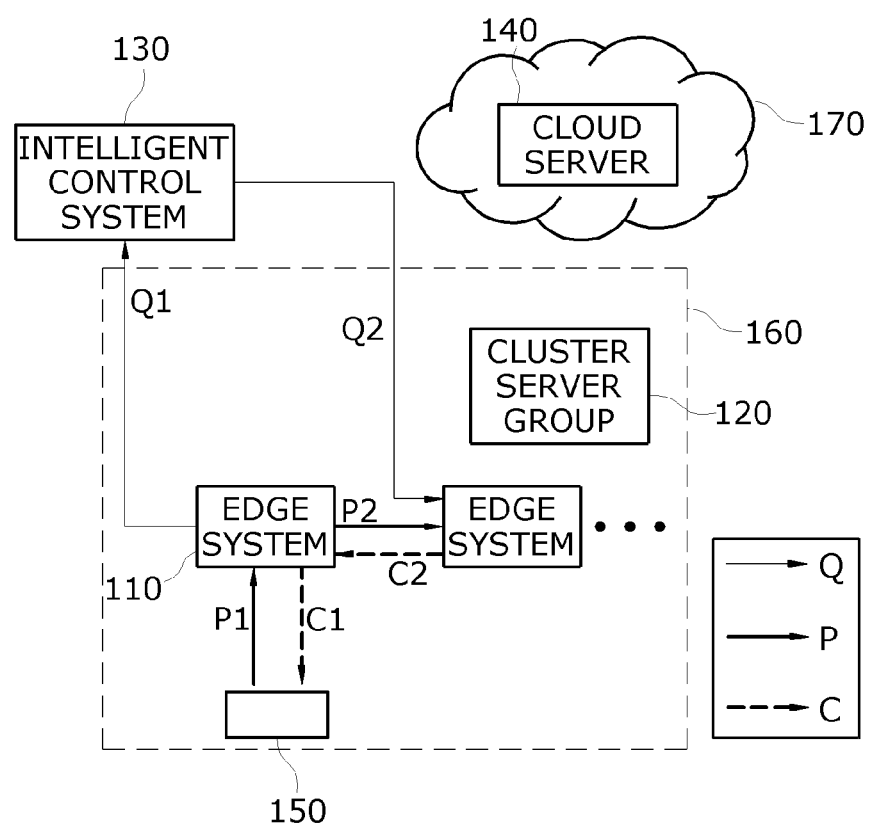
FIG. 7 shows an edge-to-edge workflow according to an example.

FIG. 7 shows an edge-to-edge workflow according to an example.

According to an exemplary embodiment of the present invention, it is possible to configure an edge-to-edge workflow between edge systems 110 without using the cluster server group 120 or the cloud server 140.

7-1. An edge system 110 analyzes a service profile of a domain service and makes a query Q1 to the intelligent control system 130 to search for relevant engine container information. A detailed engine query process will be described below with reference to FIG. 16.

7-2. The intelligent control system 130 searches for an edge system 110' which possesses a relevant engine through the engine manager 310 based on the received query Q1 and transfers a query Q2 to the edge system 110' to request connection with the edge system 110. The edge system 110' transmits a connection reply to the edge system 110 through a connection authorization process.

7-3. The pipeline manager 320 of the intelligent control system 130 sets up networking to build a data pipeline, and a data pipeline P2 is connected between the edge system 110 and the edge system 110'. When the data pipelines P1 and P2 are set up, data generated by an IoT device 150 is transmitted through the data pipelines P1 and P2 so that the edge-to-edge workflow is executed.

7-4. Like in the case of FIG. 5 described above, a control command for controlling the IoT device 150 is transferred through the path C2 and the path C1 via the edge system 110 located near the IoT device 150.

The respective operations of FIG. 7 may be performed in sequence, in parallel, or concurrently.

A connectivity process for an edge-to-edge workflow will be described in detail below with reference to FIGS. 8 to 10.

Figure 8:
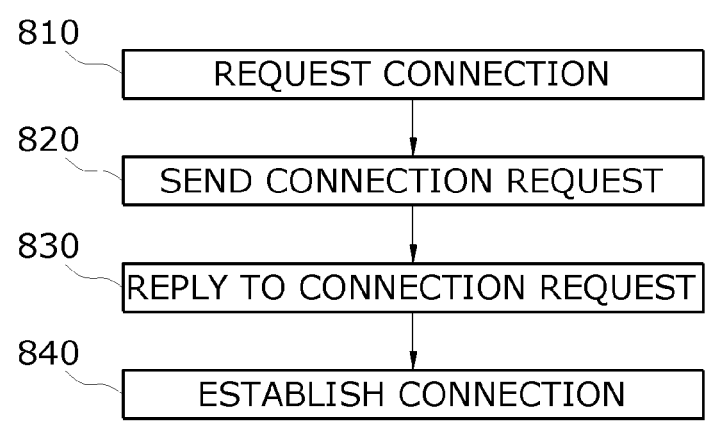
FIG. 8 is a flowchart illustrating a connectivity process for an edge-to-edge workflow according to an example.

FIG. 8 is a flowchart illustrating a connectivity process for an edge-to-edge workflow according to an example.

Specifically, FIG. 8 is a flowchart schematically showing a procedure of a method of controlling a workflow in the single domain 160 comprising the first edge system 110 and the second edge system 110' through the intelligent control system 130 with reference to FIG. 7.

8-1. In operation 810, the first edge system 110 transmits a request for connection with the second edge system 110' to the intelligent control system 130. For example, the second edge system 110' possesses an engine that the first edge system 110 requires but does not possess. For example, the first edge system 110 may transfer the request for connection with the other edge system 110' which possesses the engine required by the first edge system 110 to the intelligent control system 130.

8-2. In operation 820, when the connection request is received, the intelligent control system 130 transmits the connection request of the first edge system 110 to the second edge system 110' on the basis of location information of the second edge system 110' which is retrieved based on identity information of the second edge system 110'. For example, the identity information of the second edge system 110' is identity information of the engine of the second edge system 110' that the first edge system 110 requires. For example, the location information of the second edge system 110' is an identity of the EGE 230 of the second edge system 110'. In an example, operation 820 may further comprise an operation in which the intelligent control system 130 receives the request for connection with the other edge system 110' possessing the engine required by the first edge system 110, looks up the other edge system 110's possessing the engine through the engine manager 310, and determines the second edge system 110' from the looked-up other edge system 110'.

8-3. In operation 830, when the connection request of the first edge system 110 is received from the intelligent control system 130, the second edge system 110' transmits a reply to the connection request directly to the first edge system 110. Operation 830 comprises an operation in which the second edge system 110' receives the connection request of the first edge system 110 from the intelligent control system 130, an operation in which the second edge system 110' determines whether to authorize the connection request, and an operation in which the second edge system 110' prepares to establish the connection by configuring the connection and transmits a reply to the connection request to the first edge system 110.

8-4. In operation 840, the first edge system 110 which receives the reply to the connection request from the second edge system 110' establishes the connection. Specifically, in operation 840, the first edge system 110 receives the reply to the connection request from the second edge system 110' and configures a networking channel for the connection. The networking channel to be set up is determined according to a security level of the connection.

8-5. A data pipeline spanning from the first edge system 110 to the second edge system 110' is built.

Respective operations of FIG. 8 may be performed in sequence, in parallel, or concurrently.

Figure 9:
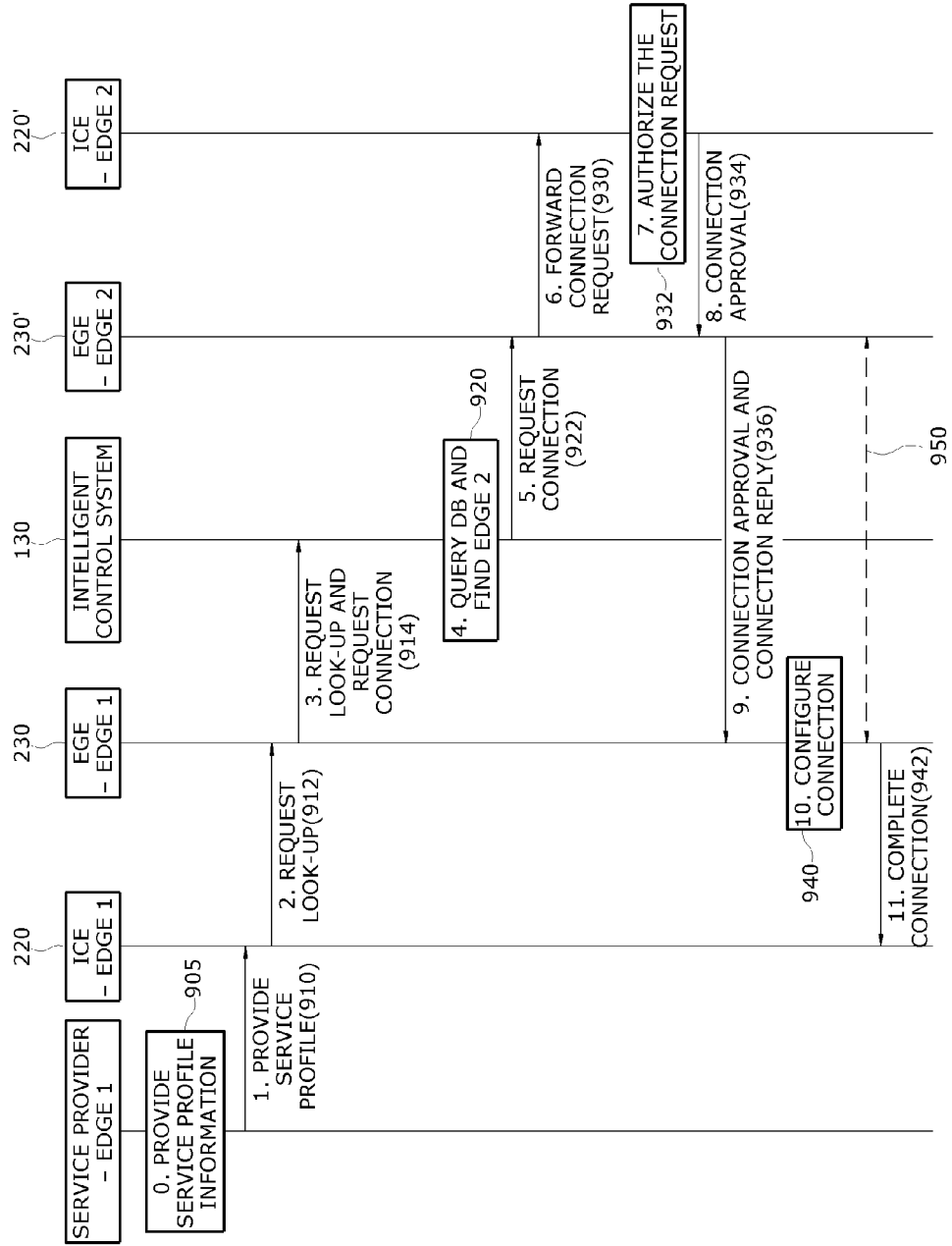
FIG. 9 is a sequential diagram illustrating a connectivity process for an edge-to-edge workflow according to an example.

FIG. 9 is a sequential diagram illustrating a connectivity process for an edge-to-edge workflow according to an example.

Specifically, FIG. 9 shows a procedure for configuring an edge-to-edge workflow between a first edge system 110 and a second edge system 110', centering on ICEs 220 and 220' and EGEs 230 and 230' which are components of the first edge system 110 and the second edge system 110'.

9-0. In operation 905, it is assumed that there is a service provider which provides a service profile that defines requirements, functions, data types, etc. necessary for the service domain (160) to the ICE 220 of the edge system 110.

9-1. In operation 910, the service provider starts a workflow request while providing the service profile to the ICE 220 of the edge system 110 so as to use the edge system 110 installed in the domain 160. In operation 910, the ICE 220 acquires service profile information.

9-2. In operation 912, the ICE 220 analyzes the service profile and requests the intelligent control system 130 to connect the first edge system 110 to the second edge system 110' based on the analyzed service profile. According to an example, in operation 912, the ICE 220 of the first edge system 110 transmits a request for looking up the other edge system 110' possessing a required engine and a request for connection with the looked-up other edge system 110' to the intelligent control system 130. In this case, the connection request may include engine information of the required engine.

9-3. In operation 914, the EGE 230 of the first edge system 110 receives the connection request and transmits the request for connection with the second edge system 110' and network information for the connection to the intelligent control system 130.

9-4. In operation 920, the intelligent control system 130 looks up a relevant engine of an edge system and retrieves the appropriate second edge system 110' through the engine manager 310. The appropriate second edge system 110' is an edge system which possesses an engine required by the first edge system 110. In another example, the appropriate second edge system 110' is an edge system designated in the connection request.

9-5. In operation 922, the intelligent control system 130 transfers the connection request to the EGE 230' of the second edge system 110'. To transfer the connection request, the intelligent control system 130 looks up a database for the second edge system 110' and a location of the second edge system 110'. For example, on the basis of the engine information of the engine included in the connection request and required by the first edge system 110, the intelligent control system 130 searches the engine database 330 for the second edge system 110' possessing the engine and the location of the second edge system 110' through the engine manager 310.

9-6. In operation 930, the EGE 230' of the second edge system 110' which receives the connection request forwards the connection request to the ICE 220' of the second edge system 110' to receive an authority approval for the connection request.

9-7. In operation 932, the ICE 220' gives an authority approval for the connection request. For example, the ICE 220' approves the connection request and includes the result of authorization in a reply to the connection request.

9-8. In operation 934, when the connection approval is finished, the ICE 220' transmits a reply for the connection approval to the EGE 230'.

9-9. In operation 936, the EGE 230' confirms the result of approval by receiving the reply for the connection approval and transmits a connection reply, to which name information of the EGE 230' (may be expressed in the form of a uniform resource locator (URL) and for example, an identity of the EGE 230' may be used) and necessary information (connection information for actual networking including, for example, an Internet protocol (IP) address or a media access control (MAC) address other than URL information) required for the connection are added, to the EGE 230 connected to the ICE 220 of the first edge system 110 which has made the connection request. The EGE 230' may prepare to establish the connection with the EGE 230, such as setting up the connection.

9-10. In operation 940, the EGE 230 of the first edge system 110 receives the reply to the connection request transmitted in operation 914 and sets up the connection. In other words, the EGE 230 sets up a networking channel for setting up a data pipeline between the first and second edge systems 110 and 110' using the received information (networking-related information including the name information, connection information, etc. of the corresponding entity). For example, when a secure IP tunnel (IP security (IPsec)-based tunnel) is required between the first and second edge systems 110 and 110' according to a service profile, the EGE 230 may make it possible to set up a secure communication channel by exchanging additional messages. In this way, a data pipeline 950 spanning from the first edge system 110 to the second edge system 110' is built. The data pipeline 950 is built between the EGE 230 and the EGE 230'. In other words, source data received from an IoT device 150 through the ENE 210 by the first edge system 110 is transferred from the EGE 230 of the first edge system 110 directly to the EGE 230' of the second edge system 110' through the data pipeline 950 without passing through the ICE 220. The EGE 230' of the second edge system 110' transfers the source data received through the data pipeline 950 to the ICE 220' of the second edge system 110'. The ICE 220' analyzes or processes the received source data by running a designated engine.

9-11. In operation 942, the EGE 230 sends a reply regarding the completed connection to the ICE 220.

After this procedure, data naturally flows from the first edge system 110 to the second edge system 110' through the data pipeline 950, and it is possible to complete an edge-to-edge workflow.

Meanwhile, the connection request operation 810 of FIG. 8 comprises operations 912 and 914 of FIG. 9, the connection request transfer operation 820 comprises operations 920 and 922 of FIG. 9, the reply operation 830 comprises operations 930, 932, 934, and 936 of FIG. 9, and the connection establishment operation 840 comprises operations 940 and 942 of FIG. 9. Respective operations of FIG. 9 may be performed in sequence, in parallel, or concurrently.

Figure 10:
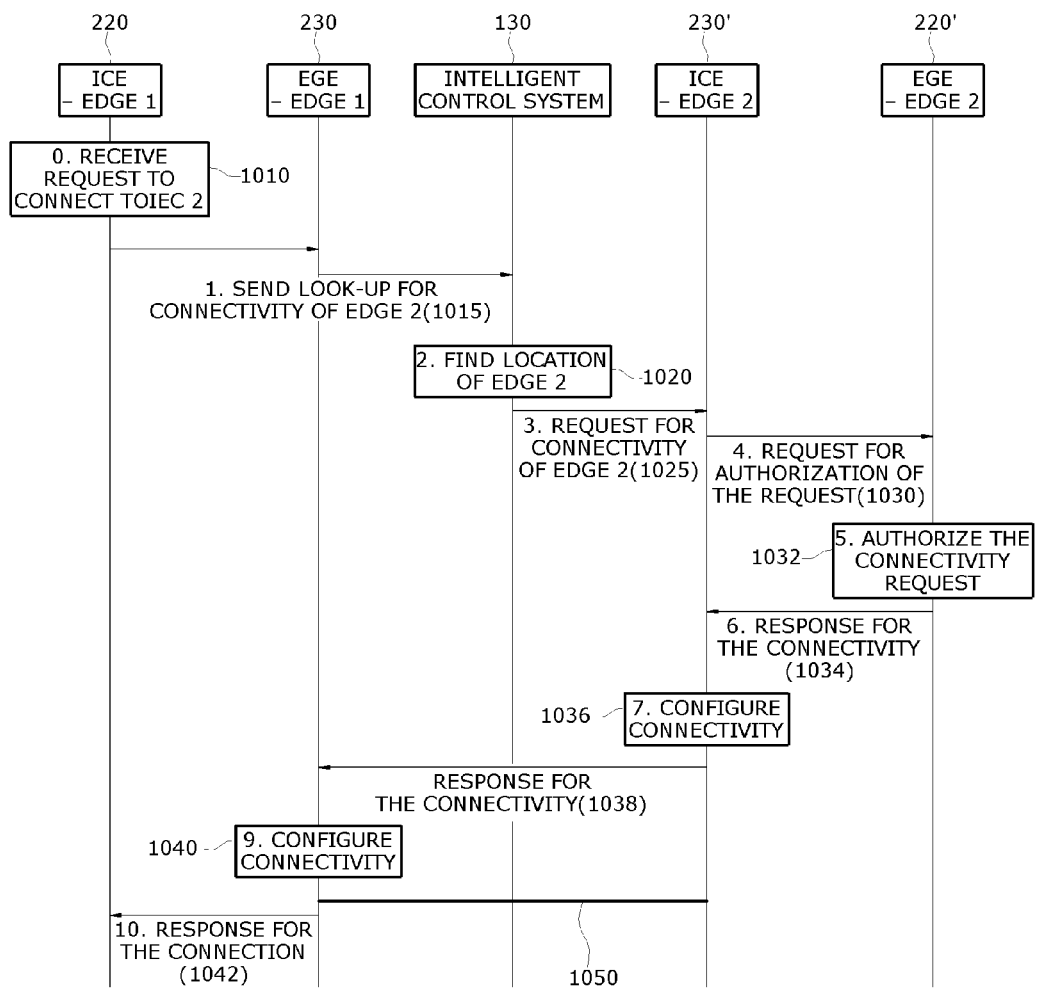
FIG. 10 is a sequential diagram illustrating a connectivity process for an edge-to-edge workflow according to another example.

FIG. 10 is a sequential diagram illustrating a connectivity process for an edge-to-edge workflow according to another example.

Specifically, FIG. 10 shows a procedure for configuring an edge-to-edge workflow between a first edge system 110 and a second edge system 110', centering on ICEs 220 and 220' and EGEs 230 and 230' which are components of the first edge system 110 and the second edge system 110'.

An intelligent edge computing system comprises the plurality of edge systems 110 and 110' and an EME 130. The edge systems 110 and 110' include ENEs 210 and 210' which provide connectivity with a terminal, the ICEs 220 and 220' which analyze data of the terminal collected through the ENEs 210 and 210', and the EGEs 230 and 230' which provide interworking with another edge system, respectively.

The EME 130 separately manages identity information of the ENEs 210 and 210', the ICEs 220 and 220', and the EGEs 230 and 230'.

10-0. In operation 1010, the ICE 220 of the first edge system 110 receives a request for connection with the other edge system 110'. For example, a service provider may request interworking between different edge systems.

10-1. In operation 1015, the ICE 220 transmits a request message to the EME 130 through the EGE 230. For example, the request message may include a lookup message for detecting a corresponding edge system as the second edge system 110'.

10-2. In operation 1020, the EME 130 detects a location of the EGE 230' of the second edge system 110' as a location of the second edge system 110'.

10-3. In operation 1025, the EME 130 transmits the connection request message to the EGE 230' at the location of the second edge system 110'.

10-4. In operation 1030, the EGE 230' transmits a connection authorization request for the connection request to the ICE 220' which is a representative of the second edge system 110'.

10-5. In operation 1032, the ICE 220' approves the request for a connection between the first edge system 110 and the second edge system 110' through the EGE 230 and the EGE 230'.

10-6. In operation 1034, the ICE 220' transmits a reply message for the connection request to the EGE 230'.

10-7. In operation 1036, the EGE 230' may prepare to establish the connection with the EGE 230, such as the connection configuration.

10-8. In operation 1038, the EGE 230' transmits the reply message to the EGE 230.

10-9. In operation 1040, the EGE 230 configures the connection between the EGE 230 and the EGE 230'. When a secure communication channel is required between the EGEs 230 and 230', an additional communication procedure may be performed.

10-10. In operation 1042, the EGE 230 forwards the reply message including the connection results to the ICE 220.

After this procedure, data naturally flows from the first edge system 110 to the second edge system 110' through a data pipeline 1050, and it is possible to complete an edge-to-edge workflow. Respective operations of FIG. 10 may be performed in sequence, in parallel, or concurrently.

Figure 11:
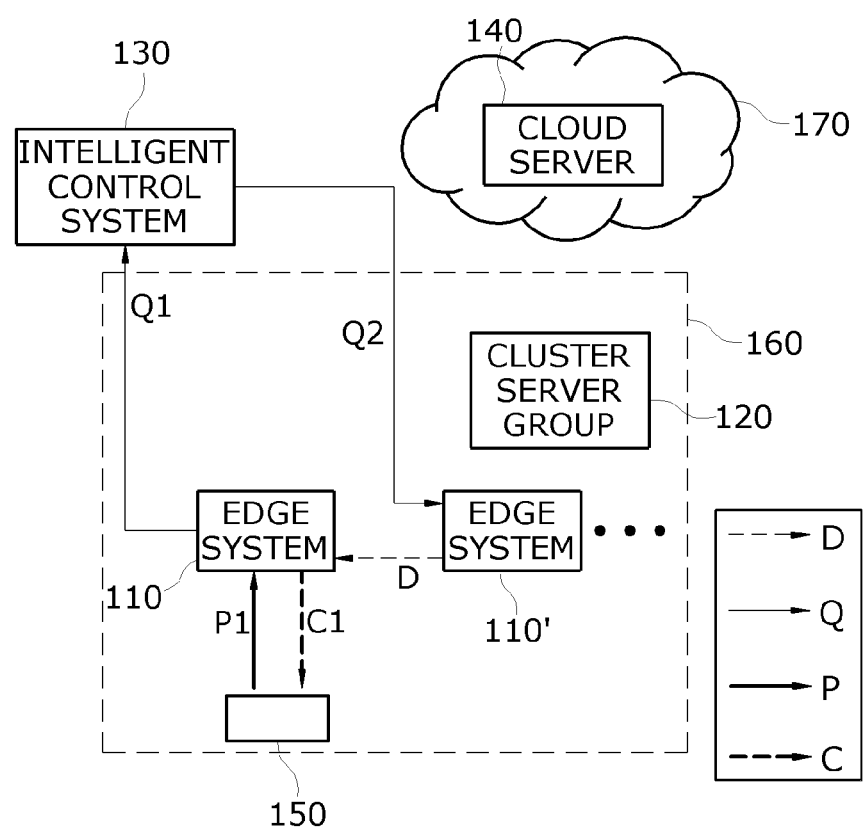
FIG. 11 shows an edge-to-edge engine download according to an example.

FIG. 11 shows an edge-to-edge engine download according to an example.

The present invention provides a method of configuring various hierarchical workflows and a function of downloading an engine container directly from another edge system 110' for an edge system 110 with low latency. To this end, the edge system 110 interworks with an intelligent control system 130 while configuring a hierarchical workflow. This is the same as in edge-to-edge workflow configuration of FIGS. 8 to 10, but it is possible to execute a workflow by downloading an engine container directly to the edge system 110 according to a set value.

An engine container download method provided in the present invention provides a comprehensive environment which enables not only to simply fetch a model and parameters but also to download and run an independent engine container. In this way, the edge system 110 is able to be expanded to run new functional elements and may run and configure several independent engines including functions for data analysis, functions for networking, and the like.

In operation Q1 of FIG. 11, the first edge system 110 requests the intelligent control system 130 to acquire an engine required for workflow execution. For example, the first edge system 110 analyzes a service profile in a service domain and transfers a query to the intelligent control system 130 to search for a relevant engine container.

In operation Q2, the intelligent control system 130 transmits the query generated by the edge system 110 to the second edge system 110' having the relevant engine container.

In operation D, the second edge system 110' which receives the request for acquiring the required engine in operation Q2 transmits the required engine or location information of the required engine to the first edge system 110 in reply to the request. In other words, the second edge system 110' which receives the query Q2 transfers engine container information to the first edge system 110 that has initially requested the engine container.

Specifically, in operation D, the second edge system 110' directly provides the engine to the first edge system 110 or provides URL information for downloading the engine online to the first edge system 110. The first edge system 110 downloads and instantiates the engine container which is directly available.

The first edge system 110 receives the required engine or the location information of the required engine.

Subsequently, the first edge system 110 actually executes a workflow, such as collecting, processing, and controlling source data, by running the engine container.

According to another example, the first edge system 110 may detect a necessary engine container through a cloud server 140 instead of the intelligent control system 130 and then download the engine container directly from the second edge system 110' having the engine container.

Meanwhile, the first edge system 110 may download an engine container (model serving or engine container download) located in the cluster server group 120 and use the downloaded engine container therein.

Figure 12:
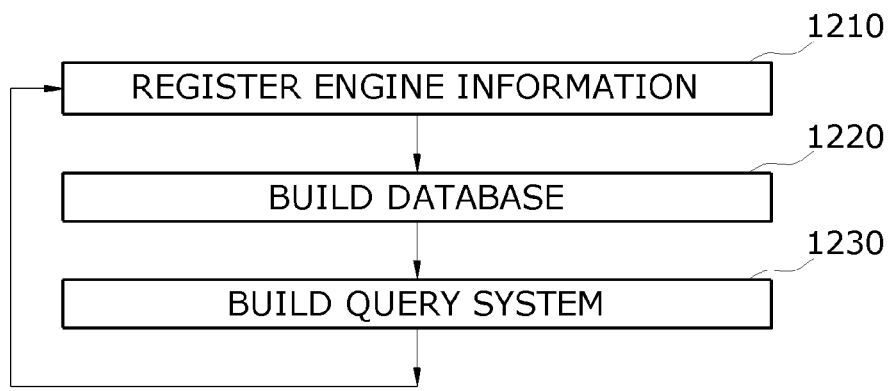
FIG. 12 is a flowchart illustrating a procedure of building an engine database and a query system according to an example.

FIG. 12 is a flowchart illustrating a procedure of building an engine database and a query system according to an example.

Specifically, FIG. 12 is a flowchart showing, with reference to FIG. 3, an example of a process in which the intelligent control system 130 builds the engine manager 310, the engine database 330 for managing engine information, and the query system 340.

In operation 1210, the intelligent control system 130 registers engine information (e.g., engine names, metadata—input type and output type, parameters, descriptions, learning models, and so on) present in the hierarchical engine framework through the engine manager 310. The engine information includes identity information of engines. The engine information may be expressed in the form of hierarchized uniform resource identifiers (URIs).

In operation 1220, the intelligent control system 130 builds the engine database 330 on the basis of the engine information registered in operation 1210. For example, a distributed engine database 330 is built by engine name-centered indexing for the registered engines. It is possible to build the distributed engine database 330 with hierarchical names like a domain name system (DNS) which is a distributed system of the existing Internet. Also, in the case of flat type names such as a sequence of numbers like hash values, a distributed hash table structure may be used.

According to an exemplary embodiment of the present invention, engine databases (330) of the intelligent control systems 130 are built for respective domains, and then a name-based hierarchical database may be built for interworking with the engine databases (330).

In operation 1230, the intelligent control system 130 builds the query system 340. For example, the hierarchical query system 340 may be built by indexing the engine names in the engine information used to build the engine database 330 in operation 1220. The engine information which has been stored in the engine database 330 may be expressed in the form of hierarchized URIs to be indexed, and the query system 340 may be built so that a corresponding engine may be found using the indexed engine information.

When a new engine information is generated, operations 1210 to 1230 are performed to update the engine database 330 and the query system 340. For example, the engine database 330 and the query system 340 may be periodically updated.

The cloud server 140 in the cloud domain may not directly participate in building domain-specific engine databases 330. Rather, an engine database 330 may be built for each domain in terms of expandability and security, and a global query system may be built by integrating the engine databases 330. The cloud server 140 for cross-domain support may separately run a global engine database for storing engine information together with indexing for engine containers and may separately include a query system.

Figure 13:
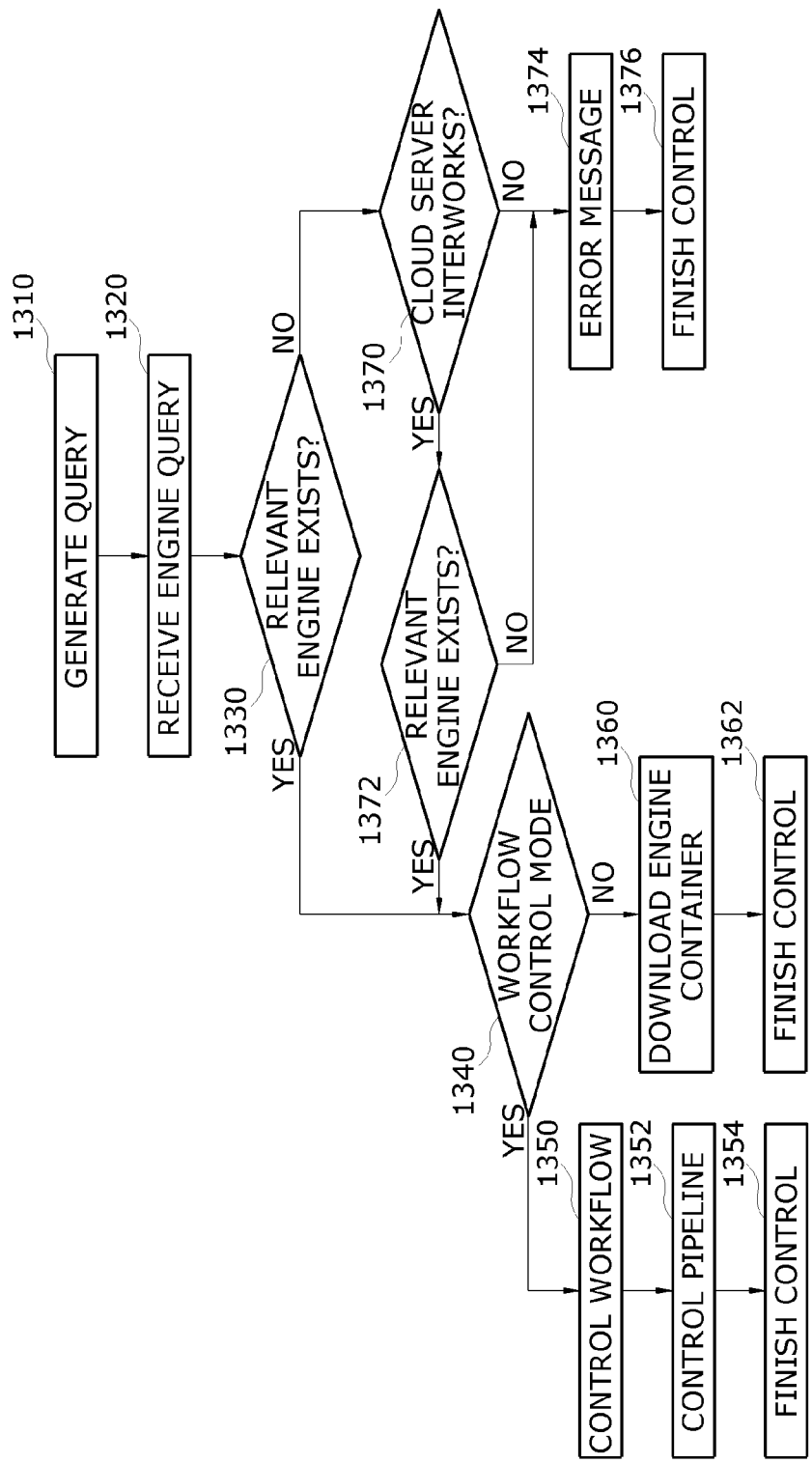
FIG. 13 is a flowchart illustrating an operating procedure of a query system for an engine database according to an example.

FIG. 13 is a flowchart illustrating an operating procedure of a query system for an engine database according to an example.

In operation 1310, an edge system 110 generates a query for an engine required for workflow execution. Before generating the query, the edge system 110 may analyze an input service profile and derive an engine required thereby from the analysis. When the edge system 110 possesses the required engine thereby, the edge system 110 directly executes the workflow using the engine without additionally operating a query system. On the other hand, when the edge system 110 does not have the required engine, the edge system 110 generates a query for the required engine in operation 1310. The engine query includes, for example, identity information of the required engine. Additionally, the engine query may include engine information such as data types, descriptions, and learning models of the engine.

In operation 1320, the edge system 110 transmits the engine query generated in operation 1310 to an intelligent control system 130. In operation 1320, the intelligent control system 130 receives the engine query and forwards the engine query to the query system 340.

In operation 1330, the query system 340 searches the engine database 330 on the basis of the received engine query and determines whether the relevant engine is present.

When it is determined in operation 1330 that the relevant engine is present, the query system 340 determines whether it is in a workflow control mode or an engine download mode in operation 1340.

When it is in the workflow control mode, the intelligent control system 130 hierarchically configures and controls the workflow through the pipeline manager 320 in operation 1350, controls a data pipeline in operation 1352, and finishes control in operation 1354.

When it is in the engine download mode, the edge system 110 directly downloads the required engine (model serving or engine container download) of a cluster server group 120 at a higher level or another edge system 110' in which the required engine is located.

When it is determined in operation 1330 that the relevant engine is not present, the query system 340 determines whether a cloud server 140 interworks with the intelligent control system 130 in operation 1370.

When it is determined in operation 1370 that the cloud server 140 interworks with the intelligent control system 130, the query system 340 of the intelligent control system 130 forwards the engine query to the cloud server 140 to cause the cloud server 140 to search for the relevant engine in operation 1372.

When the engine is found in operation 1372, the corresponding procedure is performed in operations 1340 to 1362 depending on whether to control the engine through the workflow or to directly download the engine container.

When it is determined in operation 1370 that the cloud server 140 does not interwork for cross-domain support or in operation 1372 that the engine is not found, the query system 340 transmits an error message in operation 1374 and finishes control in operation 1376.

Consequently, the present invention enables to build a workflow processing system based on a hierarchical engine framework through the intelligent control system 130 and to obtain a hierarchical workflow engine framework for cross-domain support by expanding the workflow processing system to the cloud server 140. Also, the present invention supports a function of directly downloading an engine container so that it is possible to configure a workflow with the edge systems 110 and 110' only that leads an effective support for service with low latency.

Meanwhile, the pipeline manager 320 of the intelligent control system 130 supports a workflow, which will be hierarchically configured according to a workflow execution environment controlled by the engine manager 310, by setting up networking. In general, networking is set up through a control plane employing tunneling, software defined networking (SDN), or the like to build edge-to-cluster and cluster-to-cloud data pipelines using the EGE 230 of the edge system 110, the gateway node 430 of the cluster server group 120, or the gateway node of the cloud server 140. By setting up such networking, the pipeline manager 320 enables an edge-to-edge workflow and direct download of an engine container through a secure channel.

The present invention provides a method of configuring a workflow engine framework working in cross domain environments. A workflow engine framework may operate across domains through intelligent control systems 130 of respective domains (FIG. 14) or through the cloud server 140 (FIG. 15). In other words, an intelligent control system 130 may be built to manage a workflow of a domain 160 comprising at least one cluster server group 120, and thus intelligent control systems 130 built for respective domains may constitute a global system in which the intelligent control systems 130 interwork with each other through a workflow engine framework.

Figure 14:
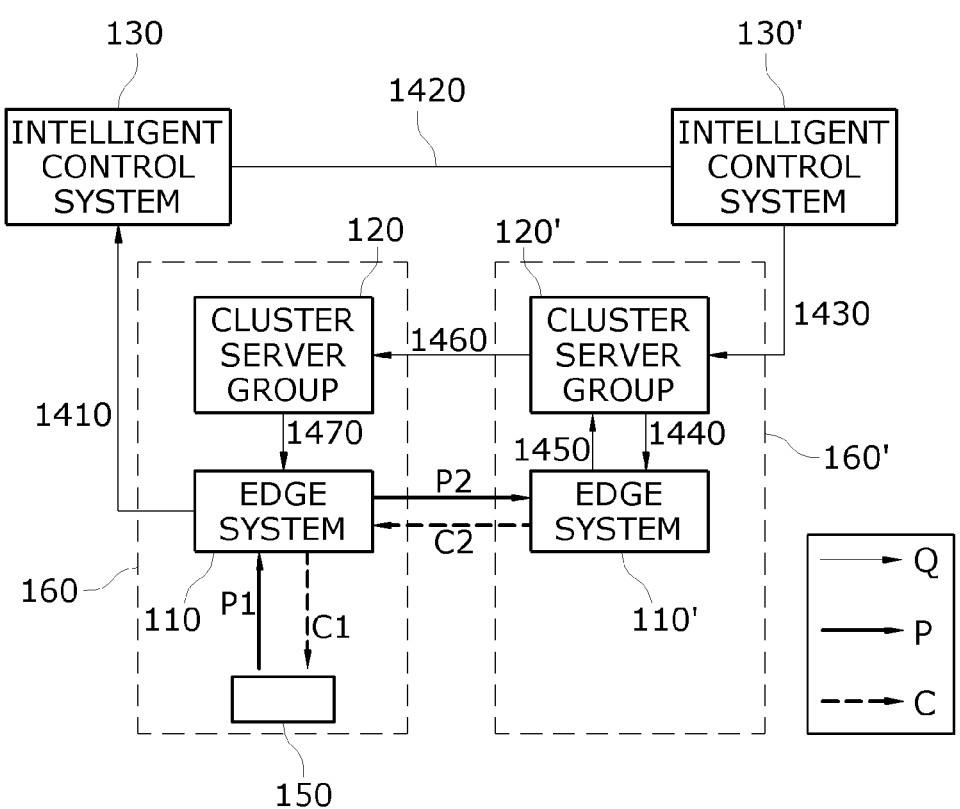
FIG. 14 shows a cross-domain edge-to-edge workflow based on intelligent control systems according to an example.
Figure 15:
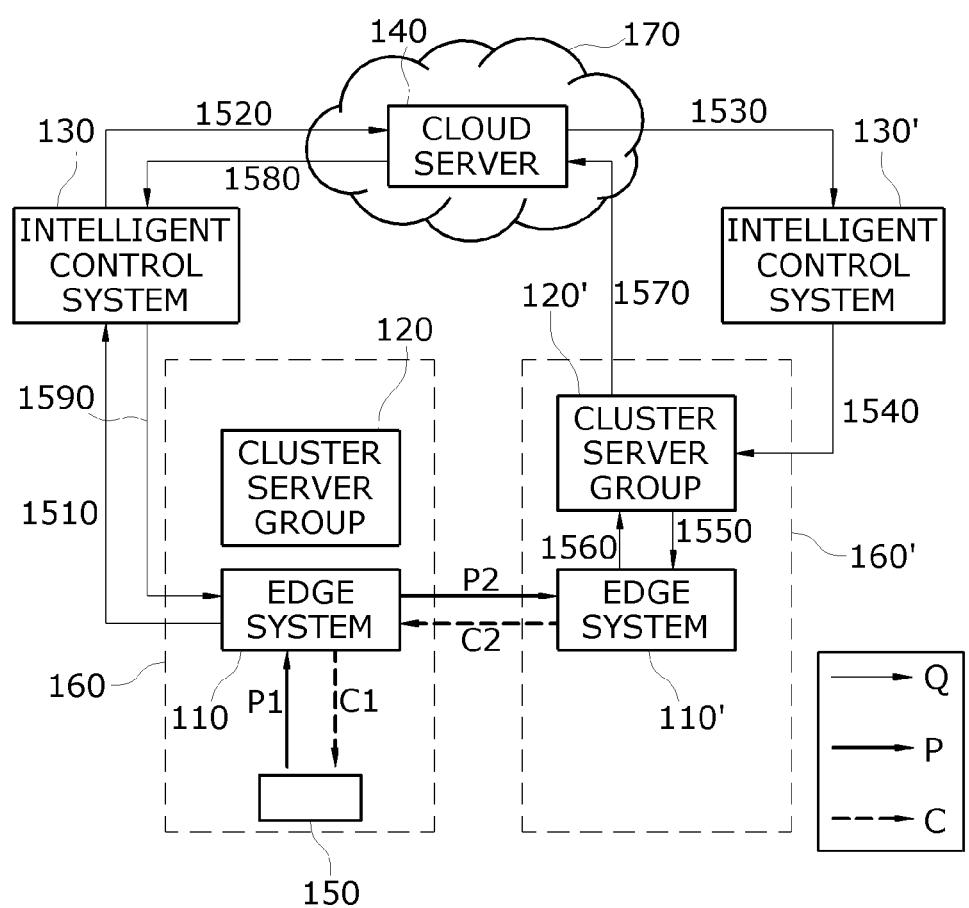
FIG. 15 shows a cross-domain edge-to-edge workflow based on a cloud server according to an example.

FIG. 14 shows a cross-domain edge-to-edge workflow based on intelligent control systems according to an example.

An intelligent control system 130 may be built in each domain, and it is possible to build an integrated system in which intelligent control systems 130 built in different domains are connected to each other by name based indexing of engine databases 330 of the intelligent control systems 130. A global engine database system employing name indexing information may be built through such integration of the intelligent control systems 130. According to a form of names, index information may be configured in a tree structure like a DNS system. Or in the case of flat type names such as a sequence of numbers like hash values, index information may be configured in a hash table structure. The global engine database system may be built in various forms.

In FIG. 14, an intelligent control system 130 manages a workflow of a domain 160 comprising at least one edge system 110 and at least one cluster server group 120, and an intelligent control system 130' manages a workflow of a domain 160' comprising at least one edge system 110' and at least one cluster server group 120'. When a global engine database shared by the intelligent control systems 130 and 130' is built, it is possible to configure an edge-to-edge workflow by interworking the edge systems 110 and 110' of the domains 160 and 160' each other across domains by referencing the global engine database.

An example process of configuring a cross-domain edge-to-edge workflow using the intelligent control system 130 on the basis of the global engine database system is as follows.

14-1. In operation 1410, the edge system 110 analyzes a service profile in the service domain (domain 1) 160 and poses a query Q to the intelligent control system 130 to find a relevant engine container.

14-2. In operation 1420, the intelligent control system 130 may find that the relevant engine container is present in the intelligent control system 130' located in the other domain (domain 2) 160' on the basis of the global engine database system.

14-3. In operation 1430, the intelligent control system 130' performs a procedure for acquiring the authorization to set up a data pipeline by forwarding the query Q to the central cluster server group 120' of domain 2 (160').

14-4. In operation 1440, the cluster server group 120' of domain 2 (160') forwards the query Q to the edge system 110' in which the engine container is actually present. In this process, when necessary, the cluster server group 120' or the edge system 110' may perform an operation regarding the authorization of use and determine whether to permit provision of the engine container to the edge system 110 of domain 1 (160) according to a security condition.

14-5. In operation 1450, the edge system 110' forwards a reply to the query Q to the cluster server group 120'.

14-6. In operation 1460, the cluster server group 120' transmits the reply to the query Q to the cluster server group 120.

14-7. In operation 1470, the cluster server group 120 forwards the reply to the edge system 110 which has initially posed the query Q. The edge system 110 which receives the reply establishes a connection to the edge system 110' and sets up a data pipeline P2. The edge systems 110 and 110' may share information with each other and set up a secure channel.

14-8. After the data pipeline P2 is set up, data collected from an IoT device 150 of domain 1 (160) is transferred from the edge system 110 to the edge system 110' of domain 2 (160') through the data pipeline P2, and an edge-to-edge workflow is executed.

14-9. For the sake of control C over the IoT device 150, a control signal is transferred through a path C2 and a path C1 in an edge-to-edge manner.

It is possible to execute an edge-to-edge workflow in cross domain environments through the above procedure.

FIG. 15 shows a cross-domain edge-to-edge workflow based on a cloud server according to an example.

In FIG. 15, an intelligent control system 130 manages a workflow of a domain 160 comprising at least one edge system 110 and at least one cluster server group 120, and an intelligent control system 130' manages a workflow of a domain 160' comprising at least one edge system 110' and at least one cluster server group 120'.

The intelligent control systems 130 of the domain 160 are able to interwork with the intelligent control system 130' of the other domain 160' through a cross-domain accessible cloud server 140. Accordingly, even when engine databases 330 of the intelligent control systems 130 and 130' does not interwork with each other, it is possible to provide a cross-domain workflow through the cloud server 140.

15-1. In operation 1510, the edge system 110 analyzes a service profile in the service domain (domain 1) 160 and poses a query Q to the intelligent control system 130 to find a relevant engine container.

15-2. In operation 1520, the intelligent control system 130 searches the engine database 330 of domain 1 (160) and forwards the query Q to the cloud server 140 when the relevant engine container is not present.

15-3. In operation 1530, the cloud server 140 searches for an engine framework having the relevant engine container and forwards the query Q to the intelligent control system 130' of domain 2 (160') when the engine framework having the relevant engine container is present in domain 2 (160').

15-4. In operation 1540 and operation 1550, the intelligent control system 130' forwards the query Q to the edge system 110' having the engine container through the cluster server group 120'.

15-5. In operation 1560, the edge system 110' transfers a reply to the query Q to the cluster server group 120'.

15-6. In operation 1570, the cluster server group 120' which receives the reply in operation 1560 forwards the reply to the cloud server 140. In operation 1580 and operation 1590, the cloud server 140 forwards the reply to the edge system 110, which has posed the query Q, through the intelligent control system 130 of domain 1 (160).

Subsequently, a data pipeline P2 spanning from an EGE 230 of the edge system 110 to an EGE 230' of the edge system 110' is set up using information of domain 2 (160') and domain 1 (160). When the data pipeline P2 is set up, security factors may be taken into consideration.

After the data pipeline P2 is set up between the edge systems 110 and 110' through pipeline managers 320 of the intelligent control systems 130 and 130' of the both domains, data is directly transferred between the edge systems 110 and 110', and a cross-domain edge-to-edge workflow is executed.

Subsequently, a control command C is transferred from the edge system 110' to an IoT device 150 through a path C2 and a path C1 in an edge-to-edge manner.

Figure 16:
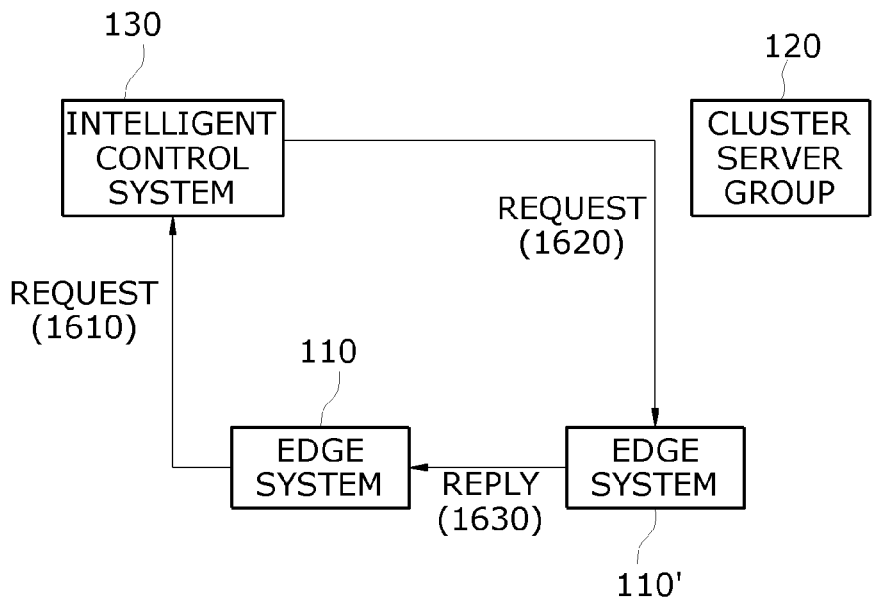
FIG. 16 shows an engine query process based on an intelligent control system according to an example.

FIG. 16 shows an engine query process based on an intelligent control system according to an example.

In other words, FIG. 16 shows a query process performed regarding an engine container by the engine manager 310 of the intelligent control system 130 to execute an edge-to-edge workflow.

In operation 1610, the edge system 110 analyzes a service profile and transmits a request including engine information of an engine container required by the edge system 110 to the intelligent control system 130. For example, the engine information may include at least one of engine identity information, an engine input type, and an engine output type.

In operation 1620, the intelligent control system 130 forwards the request to the edge system 110' having the engine container on the basis of indexing information of the engine database 330.

In operation 1630, the edge system 110' which finally receives the request transfers a reply for approving use of the engine container to the edge system 110 which has transmitted the request.

Figure 17:
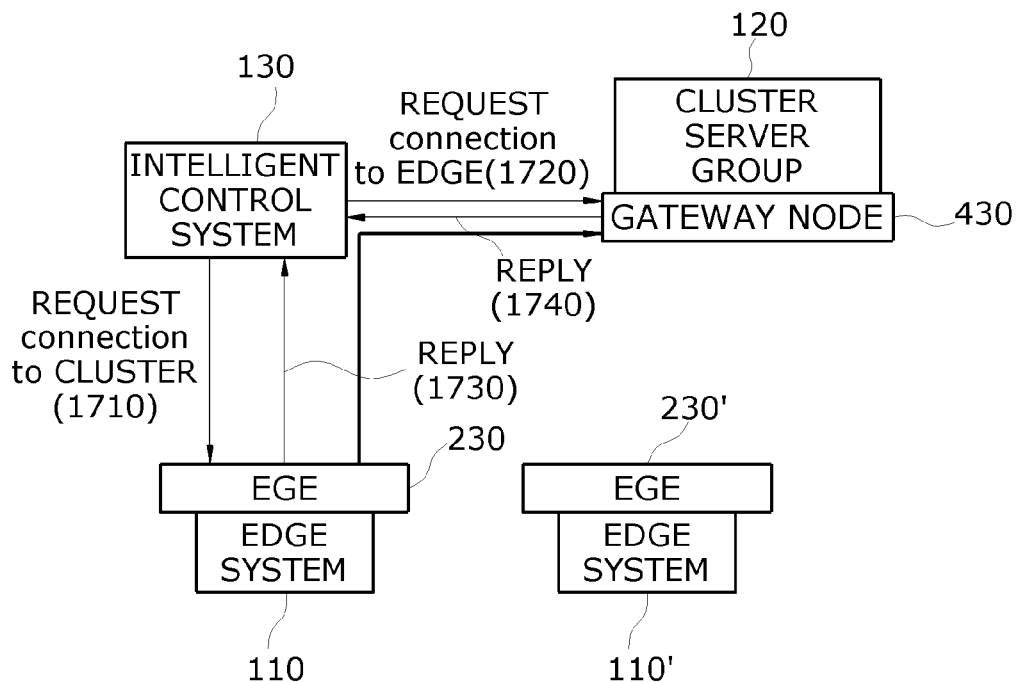
FIG. 17 shows a process of building a data pipeline through an intelligent control system according to an example.

FIG. 17 shows a process of building a data pipeline through an intelligent control system according to an example.

In other words, FIG. 17 shows a networking setup process for configuring a data pipeline through the intelligent control system 130 to execute an edge-to-cluster workflow.

In operation 1710 and operation 1720, the intelligent control system 130 separately transmits control messages to the EGE 230 of the edge system 110 and the gateway node 430 of the cluster server group 120. For example, the control messages are in a representational state transfer (RESTful) format. The EGE 230 and the gateway node 430 perform a network configuration process according to the received control messages. In an example, operation 1710 and operation 1720 may be performed at the same time as engine configuration by the engine manager 310.

Specifically, in operation 1710, the intelligent control system 130 requests the EGE 230 of the edge system 110 to set up a connection to the gateway node 430.

In operation 1720, the intelligent control system 130 requests the gateway node 430 of the cluster server group 120 to set up a connection to the EGE 230. For example, in operation 1710 and operation 1720, the intelligent control system 130 may simultaneously transmit the requests.

In operation 1730, the intelligent control system 130 receives a reply indicating completion of connection setup transmitted by the EGE 230 of the edge system 110.

In operation 1740, the intelligent control system 130 receives a reply indicating completion of connection setup transmitted by the gateway node 430 of the cluster server group 120.

In an example, a transfer path of the control commands in operation 1710 to operation 1740 may be configured in the form of an existing SDN controller and SDN switch or router. Alternatively, it is possible to use a technique employing an IP tunnel, a general packet radio service (GPRS) tunneling protocol (GTP) tunnel, identity separation, and the like.

As described above, the present invention proposes a hierarchical workflow engine framework built across various domains, such as a business domain, a purpose domain, and a spatial domain, and relates to a system for controlling a workflow through such a hierarchical workflow engine framework.

The engine framework of the present invention is capable of analyzing and processing numerous pieces of data, which are generated from IoT terminals (e.g., sensors) across domains, with low latency and provides an efficient distributed workflow execution and control service.

Also, the present invention provides an intelligent control system which processes a workflow through interworking between edge systems within a domain or distributes a workload and processes a workflow through interworking between edge systems located in different domains. In particular, since the present invention causes interworking, such as interaction or cooperation, between different kinds of edge systems applied to various kinds of devices and supports a horizontal hierarchical structure between edge systems as well as a vertical hierarchical structure ranging from an edge system to a cloud server, it is possible to apply the present invention to a service domain which requires rapid data processing and action. Also, the present invention supports a systematic workflow engine framework such as data pipeline setup between edge systems and direct use of another edge system's engine.

The present invention provides an ultra-reliable and low-latency communication (URLLC) service by configuring a workflow engine framework, which systematically operates across domains, and supports requirements, such as massive machine type communications (mMTC), to effectively process data generated from multiple IoT devices. To this end, the present invention provides a hierarchical workflow engine framework which ranges from an edge system to a cloud server via a cluster server group. Also, it is possible to configure an independent Internet of everything (IoE) domain environment with only edge systems as necessary. The hierarchical workflow engine framework is composed of a cloud server which is built using cloud infrastructure on the public Internet, a cluster server group which performs intelligent data processing, such as big data processing and deep learning, at the center of each domain, and an edge system which directly collects and processes sensor data.

Specifically, the present invention builds a workflow engine framework with edge systems which are built in a distributed manner to support respective domain services. In particular, for data collection with low latency and rapid analysis and processing, the present invention enables edge systems to independently execute a workflow or distributes a workflow as necessary and enables an edge system and a central cluster server group to execute the workflow in a distributed manner. To this end, the present invention builds a dynamic pipeline between edge systems or from an edge system to a cloud server via a cluster server group and controls and manages an engine required for workflow execution.

The present invention proposes an intelligent control system which is able to be built in each domain. The intelligent control system builds and controls a hierarchical data pipeline so that engine components may be hierarchically used. Also, the intelligent control system registers name information of engine instances and stores and manages engine information including the name information. Further, the intelligent control system makes it possible to download and use engine instances (e.g., model serving) between edge systems located in different domains. In other words, the intelligent control system may build a workflow engine framework having various hierarchical structures including an edge-to-edge structure by dynamically configuring a data pipeline according to service requirements. In this way, the present invention may analyze data with low latency through direct interworking between edge systems and process a workflow without the help of a central cluster server group or a cloud server.

Further, the present invention may configure a systematic workflow, such as an edge-to-edge-to (repetition of an edge-to-edge connection) form, by expanding a scenario employing an independent edge-to-edge framework.

Moreover, the present invention builds a cloud convergence system for cross-domain support and provides a hierarchical workflow engine framework including the cloud convergence system. The cloud convergence system according to the present invention may derive new results by reusing data processed in each domain or an artificial intelligence (or machine learning) model and additionally processing analyzed data as big data, and provides a hierarchical interworking method for sharing source data and engine components between edge systems and cluster server groups built in a cross-domain environment. During this process, an intelligent control system of the present invention is used.

As a result, according to the present invention, a vertical hierarchical workflow engine framework is basically configured so that engine components and source data may be used across domains. Also, a horizontal edge-to-edge workflow framework may be flexibly configured to support an ultra-low latency service and an intelligent IoE service.

Meanwhile, a cross-domain workflow control system based on a hierarchical engine framework according to an exemplary embodiment of the present invention may be implemented in a computer system or recorded in a recording medium. The computer system may include at least one processor, a memory, a user input device, a data communication bus, a user output device, and a storage. The aforementioned components perform data communication with each other through the data communication bus.

The computer system may further include a network interface coupled to a network. The processor may be a central processing unit (CPU) or a semiconductor device which processes instructions stored in the memory and/or the storage.

The memory and the storage may include various types of volatile or non-volatile storage media. The memory may include a read-only memory (ROM) and a random access memory (RAM).

Therefore, the cross-domain workflow control system based on a hierarchical engine framework according to an exemplary embodiment of the present invention may be implemented in a computer-executable manner. When a workflow control method according to an exemplary embodiment of the present invention is performed in a computer system, computer-readable instructions may perform the workflow control method.

Meanwhile, the above-described workflow control method according to the present invention may be implemented as computer-readable code in a computer-readable recording medium. The computer-readable recording medium includes all types of recording media which store data which can be read by a computer system. For example, the computer-readable recording medium may include a ROM, a RAM, a magnetic tape, a magnetic disk, a flash memory, an optical data storage device, and the like. Also, the computer-readable recording medium may be stored and executed as code which is distributed to computer systems connected via a computer network and read in a distributed manner.

In exemplary embodiments of the present invention, each of components, functional blocks, or means may be composed of one or more sub-components. Electric, electronic, and mechanical functions performed by respective components may be implemented as various well-known elements or mechanical elements, such as electronic circuits, integrated circuits (ICs), and application specific integrated circuits (ASICs). The functions may be separately implemented, or two or more of the functions may be integrally implemented.

Combinations of respective blocks of the accompanying block diagrams and respective operations of flowcharts may be performed by computer program instructions. These computer program instructions may be loaded into a processor of a general-use computer, a special purpose computer, a laptop computer, a network computer, a mobile device such as a smart phone, a server for providing an online game service, or other programmable data processing equipment. Therefore, the instructions which are executed by a processor of a computer device or other programmable data processing equipment generate a means for performing functions described in each block of the accompanying block diagrams or each operation of the flowcharts. These computer program instructions are able to be stored in a memory available in a computer device or a computer device capable of directing other programmable data processing equipment or in a computer-readable memory. Therefore, it is also possible to produce a manufactured article including an instruction means for performing functions described in respective blocks of the block diagrams or respective operations of the flowcharts. Since computer program instructions are able to be loaded onto a computer device or other programmable data processing equipment, the computer device or the programmable data processing equipment is able to generate a process for performing a series of operations and provide operations for performing functions described in respective blocks of the block diagrams or respective operations of the flowcharts.

Each block or each operation may represent a module, a segment, or a part of code including one or more executable instructions for implementing the specified logical function(s). In some alternative embodiments, functions noted in blocks or operations may occur out of order. For example, two blocks or operations shown in succession may, in practice, be executed substantially concurrently, or the blocks or operations may sometimes be executed in the reverse order, depending on the corresponding functionality.

In exemplary embodiments of the present invention, computing systems, computing devices, systems, servers, server groups, electronic devices, or various devices refer to all calculation means, such as a desktop computer, a laptop computer, a smart phone, a PDA, a cellular phone, and a game machine, capable of collecting, reading, processing, storing, and displaying data. The calculation means are devices which may execute software written in readable code and have a function for displaying the executed software to a user. As necessary, the devices may store software by itself or read software together with data from outer sources.

In the present invention, a server or a server group may be, for example, a single server computer or a system similar thereto, or one or more server banks or a plurality of servers arranged in an array other than that of server banks. The server or the server group may be located in a single facility or distributed over many different geographic locations. Each server may include a processor, a communication interface, and a memory. The processor, the memory, and the communication interface may be connected with each other via a communication bus.

In exemplary embodiments of the present invention, computing systems, computing devices, systems, servers, server groups, electronic devices, or various devices have not only a data processing function but also input, output, storage, etc. functions. To this end, the computing systems, computing devices, systems, servers, server groups, electronic devices, or various devices may include not only various elements of general computer devices, such as a CPU, a mainboard, a graphic card, a hard disk drive, a sound card, a speaker, a keyboard, a mouse, a monitor, a universal serial bus (USB), and a communication modem, but also a CPU, a mainboard, a graphic chip, a memory chip, a sound engine, a speaker, a touchpad, an external connection terminal, such as a USB terminal, a communication antenna, a communication modem for implementing third generation (3G), long term evolution (LTE), long term evolution-advance (LTE-A), wireless fidelity (WiFi), Bluetooth, and other communication, etc. of wireless smart phones. These various elements may implement one or more functions solely or in combination, or parts of various elements may be combined to implement one or more functions. Devices or parts thereof illustrated as one or more blocks in the drawings or the detailed descriptions according to exemplary embodiments of the present invention may denote that various elements implement one or more functions solely or in combination or parts of various elements are combined to implement one or more functions.

A cross-domain workflow control system based on a hierarchical engine framework according to an exemplary embodiment of the present invention is able to provide a low-latency workflow service by building a flexible hierarchical engine framework.

A cross-domain workflow control system based on a hierarchical engine framework according to an exemplary embodiment of the present invention is able to control a workflow by building an engine and a data pipeline across domains.

The present invention has been described above with reference to exemplary embodiments. Those of ordinary skill in the technical field to which the present invention pertains should understand that various modifications and alterations can be made without departing from the spirit and scope of the present invention. Therefore, it should be understood that the disclosed embodiments are not limiting but illustrative. The scope of the present invention is defined not by the specification but by the claims, and it should be understood that the present invention encompasses all differences within the equivalents thereof.

What is claimed is:

1. A workflow control system for controlling a workflow based on a hierarchical engine framework, the workflow control system comprising:
    an edge system comprising an edge networking entity configured to provide connectivity with a terminal, an intelligent computing entity configured to execute at least one engine for analyzing data of the terminal collected through the edge networking entity and processing a workflow, and an edge gateway entity configured to provide a function of interworking with another system through a data pipeline built based on the hierarchical engine framework; and
    an intelligent control system configured to control the workflow based on the at least one engine and the data pipeline,
    wherein the hierarchical engine framework is an architecture in which engines of an engine group executing a workflow are structured according to layers, and
    wherein the data pipeline is a data path for transferring the data collected or analyzed by the edge system from the edge system to the other system.

2. The workflow control system of claim 1, further comprising a cluster server group, wherein the cluster server group comprises:
an engine node configured to execute at least one engine to process the workflow based on data received from the edge system; and
a gateway node configured to provide interworking with the edge system through the data pipeline built based on the hierarchical engine framework.

3. The workflow control system of claim 2, wherein the gateway node provides a data input and output function to the at least one engine through the data pipeline according to the workflow.

4. An intelligent edge computing system comprising:
a plurality of edge systems each comprising an edge networking entity configured to provide connectivity with a terminal, an intelligent computing entity configured to analyze data of the terminal collected through the edge networking entity, and an edge gateway entity configured to provide interworking with another edge system through a data pipeline built based on a hierarchical engine framework; and
an edge identity management entity configured to separately manage identity information of the edge networking entities, the intelligent computing entities, and the edge gateway entities,
wherein the hierarchical engine framework is an architecture in which engines of an engine group executing a workflow are structured according to layers, and
wherein the data pipeline is a data path for transferring the data collected or analyzed by the edge system from the edge system to the other edge system.

5. The intelligent edge computing system of claim 4, wherein the plurality of edge systems comprise a first edge system and a second edge system, and
when a request for connection with the second edge system is received from the edge gateway entity of the first edge system, the edge identity management entity searches for a location of the second edge system and transmits the connection request to the edge gateway entity of the second edge system.

6. The intelligent edge computing system of claim 4, wherein the plurality of edge systems comprise a first edge system and a second edge system, and
when the second edge system receives a connection request of the first edge system from the edge identity management entity through the edge gateway entity of the second edge system, the edge gateway entity of the second edge system requests the intelligent computing entity of the second edge system to authorize the connection request, the intelligent computing entity of the second edge system authorizes the connection request and transfers a reply to the connection request to the edge gateway entity of the second edge system, and the edge gateway entity of the second edge system prepares to establish the connection and transmits the reply to the edge gateway entity of the first edge system.

7. The intelligent edge computing system of claim 4, wherein the plurality of edge systems comprise a first edge system and a second edge system,
the intelligent computing entity of the first edge system transmits a request for connection with the second edge system to the edge identity management entity through the edge gateway entity of the first edge system and receives a reply to the connection request from the second edge system through the edge gateway entity of the first edge system, and the edge gateway entity of the first edge system configures a connection with the edge gateway entity of the second edge system and forwards a reply including a result of the connection to the intelligent computing entity of the first edge system.

8. The intelligent edge computing system of claim 4, wherein the plurality of edge systems comprise a first edge system and a second edge system,
the first edge system analyzes a service profile in a first domain and poses a query to the edge identity management entity to find a relevant engine container,
the edge identity management entity searches an engine database of the first domain and forwards the query to a cloud server when the relevant engine container is not present,
an intelligent control system in a second domain forwards the query to the second edge system through a cluster server group of the second domain, when the cloud server forwards the query to the intelligent control system in the second domain, and when an engine framework having the relevant engine container is present in the second domain,
the second edge system transfers a reply to the query to the first edge system through the cluster server group in the second domain, the cloud server, the edge identity management entity, and
the edge gateway entity of the first edge system and the edge gateway entity of the first edge system are connected with the data pipeline.

9. An edge system for processing a workflow based on a hierarchical engine framework, the edge system comprising:
an edge networking entity configured to provide connectivity with a terminal;
an intelligent computing entity configured to execute at least one engine for analyzing data of the terminal collected through the edge networking entity and processing a workflow; and
an edge gateway entity configured to provide interworking with another system through a data pipeline built based on the hierarchical engine framework,
wherein the hierarchical engine framework is an architecture in which engines of an engine group executing a workflow are structured according to layers, and
wherein the data pipeline is a data path for transferring the data collected or analyzed by the edge system from the edge system to the other system.

10. The edge system of claim 9, wherein the other system is another edge system in a domain identical to a domain of the edge system, and
the edge system sequentially interworks with the other edge system through the data pipeline, the hierarchical engine framework on which the data pipeline is based being a horizontal engine framework.

11. The edge system of claim 9, wherein the other system is a cluster server group in a domain identical to a domain of the edge system, and
the edge system hierarchically interworks with the cluster server group through the data pipeline.

12. The edge system of claim 9, wherein the other system is another edge system or a cluster server group, and
the data pipeline is a data path for transferring the data analyzed by the intelligent computing entity to the other edge system or the cluster server group through the edge gateway entity.

* * * * *